US008182344B2

(12) United States Patent
Bleich et al.

(10) Patent No.: US 8,182,344 B2
(45) Date of Patent: May 22, 2012

(54) INTELLIGENT BUTTON FOR A GAMING MACHINE

(75) Inventors: Charles R. Bleich, Cary, IL (US); Stephen A. Canterbury, Antioch, IL (US); John W. Skalon, Des Plaines, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 85 days.

(21) Appl. No.: 12/843,646

(22) Filed: Jul. 26, 2010

(65) Prior Publication Data

US 2010/0292001 A1 Nov. 18, 2010

Related U.S. Application Data

(63) Continuation of application No. 10/726,929, filed on Dec. 3, 2003, now Pat. No. 7,775,872, which is a continuation-in-part of application No. 10/611,626, filed on Jun. 30, 2003, now Pat. No. 7,300,351.

(51) Int. Cl.
*A63F 13/00* (2006.01)

(52) U.S. Cl. ................. 463/37; 463/30; 463/31; 463/36

(58) Field of Classification Search .................... 463/30, 463/31, 36, 37
See application file for complete search history.

(56) References Cited

U.S. PATENT DOCUMENTS

| | | | | |
|---|---|---|---|---|
| 5,273,281 | A | 12/1993 | Lovell | 273/138 R |
| 5,342,047 | A | 8/1994 | Heidel et al. | 273/85 CP |
| 5,393,057 | A | 2/1995 | Marnell | 273/85 CP |
| 5,472,196 | A | 12/1995 | Rusnak | 273/138 A |
| 5,720,662 | A | 2/1998 | Holmes, Jr. et al. | 463/20 |
| 6,027,115 | A | 2/2000 | Griswold et al. | 273/143 R |
| 6,056,642 | A | 5/2000 | Bennett | 463/20 |
| 6,190,254 | B1 | 2/2001 | Bennett | 463/13 |
| 6,210,275 | B1 | 4/2001 | Olsen | 463/16 |
| 6,251,013 | B1 | 6/2001 | Bennett | 463/13 |
| 6,261,178 | B1 | 7/2001 | Bennett | 463/20 |
| 6,270,409 | B1 | 8/2001 | Shuster | 463/20 |
| 6,270,411 | B1 | 8/2001 | Gura et al. | 463/20 |
| 6,310,308 | B1 | 10/2001 | Watson et al. | 200/520 |
| 6,358,149 | B1 | 3/2002 | Schneider et al. | 463/27 |
| 6,390,473 | B1 | 5/2002 | Vancura et al. | 273/292 |
| 6,454,649 | B1 | 9/2002 | Mattice et al. | 463/17 |
| 6,491,584 | B2 | 12/2002 | Graham et al. | 463/25 |
| 6,517,433 | B2 | 2/2003 | Loose et al. | 463/20 |
| 2002/0036381 | A1 | 3/2002 | Scibetta | 273/292 |
| 2002/0105535 | A1 * | 8/2002 | Wallace et al. | 345/719 |
| 2002/0151345 | A1 | 10/2002 | Byrne | 463/18 |
| 2002/0173354 | A1 | 11/2002 | Winans et al. | 463/20 |

(Continued)

FOREIGN PATENT DOCUMENTS

| | | | |
|---|---|---|---|
| EP | 0 933 735 | A3 | 10/2003 |

(Continued)

*Primary Examiner* — James S McClellan
(74) *Attorney, Agent, or Firm* — Nixon Peabody LLP

(57) ABSTRACT

A game button includes an enclosure in which are mounted at least one variable display, a sensor, a memory, and any other components of the game button. The variable display is capable of presenting a plurality of images thereon. The memory is communicatively coupled with the variable display, is adapted to store information for producing the plurality of images presented on the display, and is physically located between the variable display and the sensor.

23 Claims, 14 Drawing Sheets

U.S. PATENT DOCUMENTS

| | | | | |
|---|---|---|---|---|
| 2003/0054878 | A1 | 3/2003 | Benoy et al. | 463/29 |
| 2003/0087688 | A1 | 5/2003 | Kato | 463/20 |
| 2003/0100360 | A1 | 5/2003 | Manfreidi et al. | 463/25 |
| 2003/0119581 | A1 | 6/2003 | Cannon et al. | 463/25 |
| 2004/0038721 | A1 * | 2/2004 | Wells | 463/16 |
| 2004/0038725 | A1 | 2/2004 | Kaminkow | 463/20 |
| 2004/0062025 | A1 | 4/2004 | Satoh et al. | 362/27 |
| 2004/0254014 | A1 * | 12/2004 | Quraishi et al. | 463/29 |

FOREIGN PATENT DOCUMENTS

| | | | |
|---|---|---|---|
| GB | 2 072 395 | A | 9/1981 |
| GB | 2 092 797 | A | 8/1982 |
| GB | 2 098 779 | A | 11/1982 |
| GB | 2 099 198 | A | 12/1982 |
| GB | 2 100 492 | A | 12/1982 |
| WO | WO 97/27568 | | 7/1997 |

* cited by examiner

60

INTELLIGENT BUTTON FOR A GAMING MACHINE

REFERENCE TO RELATED APPLICATIONS

This application is continuation of U.S. application Ser. No. 10/726,929, titled "Intelligent Button For A Gaming Machine," now allowed, filed Dec. 3, 2003, which is a continuation-in-part of U.S. application Ser. No. 10/611,626 titled "Gaming Machine Having a Player Time-Selectable Bonus Award Scheme," filed Jun. 30, 2003, now issued as U.S. Pat. No. 7,300,351 on Nov. 27, 2007, each of which is incorporated herein by reference in its entirety.

FIELD OF THE DISCLOSURE

This invention is directed to gaming machines, and more particularly, to a gaming machine having a player time-selectable bonus award.

BACKGROUND

Gaming machines providing wagering base games such as electronically driven video slots, video poker, video blackjack, video keno, video bingo, video pachinko, video lottery, and mechanically driven spinning reel slots, etc., are well known in the gaming industry. Generally gaming machines are configured to operate as "stand-alone" units (that may or may not be coupled to a backroom computer) where the outcome of game play is "locally determined", or as part of a server-based gaming network where the outcome of game play may be either locally determined or "centrally determined". For example, a gaming machine located in a bar, a convenience store, a riverboat, or an airplane, may operate as a stand-alone unit, while a gaming machine located in a traditional casino may operate as part of a server-based gaming network within the casino.

Mechanical spinning reel slot machines have maintained their popularity evolving from gaming machines which employ electromechanical control to the more modern day gaming machines which employ micro-processor control. In a modern mechanical spinning reel slot machine, mechanical spinning reels are used to display combinations of reel symbols, which in conjunction with pay line selections, visually notify a game player if he/she has won or lost the slot base game played entirely in controller or computer memory according to rules and math models embedded in a computer program. A modern gaming machine providing video base wagering games (e.g., video poker, video blackjack, video keno, video bingo, video pachinko, video lottery, and the like) is similar to the mechanical spinning reel slot machine in terms of its embedded computer program and operation, however, simulated video images of reels, pay lines, cards, number, etc. are provided by a video display. The video display may be implemented via any type of suitable display, for example, it may be a cathode ray tube (CRT), a liquid crystal display (LCD), or a plasma display.

Recently, secondary or bonus games have been used in conjunction with base games to increase or enhance player enjoyment and therefore encourage game play on the modern gaming machines. Bonus games, however, are triggered by various events during base game play and once the bonus game is triggered, base game play stops and the bonus game begins. The player cannot "store" bonus games for later game play and therefore has little control over when the bonus game is played.

A bonus game may require a player to play a version of the base wagering game or to play a different wagering game offered by the gaming machine. The player of the bonus game may or may not be awarded additional credits. For example, a mechanical spinning reel slot machine can be configured with a bonus game awarding free spins to a player and may therefore be played like the base game. The free spin however, may result in a non-winning symbol combination and therefore the player is not awarded additional credits. In addition, a complex bonus game that differs from its associated base game may require that the player quickly learn new game skills to play the bonus game, thereby changing the rhythm of game play for the player.

SUMMARY OF THE INVENTION

The present invention provides a gaming machine having a player time-selectable bonus award scheme whereby a player redeems, at a time of the player's choosing winning outcomes accrued during base game play. Redemption of each accrued winning outcome is accomplished when a player selects an option to display a winning symbol combination associated with the winning outcome. Selection of the option to display the winning symbol combination associated with the winning outcome always yields an award (i.e., a value payout to the player) and sometimes yields another winning outcome, also redeemable at a time of the player's choosing. A counter display on the gaming machine informs the player of the number of available accrued winning outcomes. The counter display increments a number each time a winning outcome is accrued and decrements the number as each winning outcome is redeemed.

Therefore, a method of game play on a gaming machine is disclosed where a second game may be initiated before a first game is completed. The method includes (a) initiating a first game on the gaming machine upon detecting a wager from a player to play the first game, (b) initiating a second game on the gaming machine during game play of the first game, (c) displaying a first outcome associated with the first game after the second game is initiated, and (d) displaying a second outcome associated with the second game, the second outcome displayed in response to an option being exercised by the player after the first outcome is displayed. Initiating the second game includes accruing a winning outcome based on a predetermined criterion occurring during game play of the first game. The option is provided to the player after initiating the second game. The method also includes awarding a first value payout to the player if the first outcome is a winning symbol combination where the first value payout is displayed on a win meter of the gaming machine, or displaying an indication of a non-winning symbol combination on the win meter if the first outcome is a non-winning symbol combination. Displaying the second outcome includes displaying a winning symbol combination associated with the winning outcome and awarding a second value payout where the second value payout is displayed on the win meter. Thus, the winning symbol combination associated with the second game outcome is displayed after the first outcome is displayed and when the winning outcome is redeemed by the player.

A winning outcome may accrue in response to an occurrence of a pre-selected symbol or a symbol combination during base game play. A winning outcome may also accrue pseudo-randomly as a result of a pseudo random output generator device (e.g., a random number generator (RNG), pooled tickets, etc.) that generates game play outcomes corresponding to a predetermined probability of occurrences of non-winning and winning symbol combinations, or may accrue based on predetermined criterion such as player identity, promotional events, the number of base games played, a dollar amount or credit amount played or won by the player, player tracking card data, the time of day, day of week, etc.

The winning symbol combination revealed upon displaying the second outcome may be selected from among base game winning symbol combinations displayed in a base game pay table or may be selected from among bonus game winning symbol combinations displayed in a bonus game pay table.

Displaying the second outcome may occur in a variety of ways depending on the gaming machine configuration and the player's preferences. In one embodiment, the gaming machine having a player time-selectable bonus award scheme is configured with an "intelligent" game button having a counter display or meter that increments a number each time a game associated with a winning outcome is initiated and decrements the number each time a winning symbol combination associated with the winning outcome is displayed (i.e., each time the player chooses to redeem an accrued winning outcome).

In addition to the counter display, the intelligent game button also includes a sensor, a first printed circuit board, a first plurality of light emitters fixedly coupled to the first printed circuit board, and a microcontroller mounted to the first printed circuit board and operatively coupled to the sensor and the first plurality of light emitters. The microcontroller includes a microprocessor and a memory coupled to the microprocessor. The sensor may be a micro-switch, a Hall-effect sensor, an optic sensor, an eddy current sensor, a resistive sensor, a piezo sensor, or a strain gage sensor, to name a few. The game button also includes a button chassis coupled to the first printed circuit board where the button chassis is configured with a raised edge or bezel, and where the button chassis is formed of a transparent material enabling player viewing of a plurality of variable illumination patterns of the first plurality of light emitters through the raised edge. The game button further includes a button face assembly where the button face assembly is sized to fit within an area bounded by the raised edge of the button chassis, a plunger-spring assembly positioned between the button face assembly and the button chassis where the plunger-spring assembly is sized to fit within the area bounded by the raised edge of the button chassis, a second printed circuit board coupled to the plunger-spring assembly, a second plurality of light emitters fixedly coupled to the second printed circuit board, and an inter-board connector electrically coupling the second printed circuit board to the first printed circuit board. The first plurality of lights emitters and the second plurality of light emitters are preferably surface mounted light emitting diodes. The counter display or display device, preferably a two seven-segment light emitting diode display, is mounted on the second printed circuit board and is adapted to display game information such as the number of accrued winning outcomes, to the player. The button face assembly includes an illuminator plate coupled to the second printed circuit board where the illuminator plate has a first display aperture to allow the display device to display game information, a transparent lens cap, and a legend plate positioned between the transparent lens cap and the illuminator plate where the legend plate has a second display aperture to allow the display device to display game information. The microcontroller of the game button is operatively coupled to a controller of the gaming machine.

The present invention also provides a method of operating the intelligent game button. The method includes detecting an event, and in response to the event, causing a variable illumination pattern of the first and/or second plurality of light emitters to be displayed to a player of the gaming machine. The method may additionally include transmitting a signal to a gaming machine controller in response to the event. The event may include receiving an indication of a player selection of the game button, a base game play event, a bonus game play event, a time of day, a day of a week, a promotional activity, a local activity, an identity of the player, a game selection made by the player or a selection made by a casino operator, to name a few. The event may also include receiving a signal from the gaming machine controller. Thus, in addition to detecting a player selection, the microcontroller of the game button can cause any number of illumination patterns to be displayed on the game button.

A method of gaming machine operation according to an embodiment of the invention is also disclosed. The gaming machine includes, among other components, an electro-mechanical device and a controller having processor and a memory operatively coupled to the processor. The method of gaming machine operation includes allowing a player to make a wager for game play on the gaming machine, causing game play images associated with the game play to be displayed on a display device of the gaming machine, causing the electro-mechanical device to generate an audible indication where the audible indication notifies the player of a game play occurrence, and determining a value payout associated with an outcome of the game play. The audible indication is preferably generated by actuation of a solenoid of the electro-mechanical device, in which case, the audible indication would include a clicking sound. The method may further include illuminating a light source of the gaming machine in conjunction with generating the audible indication.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

Figure 1:
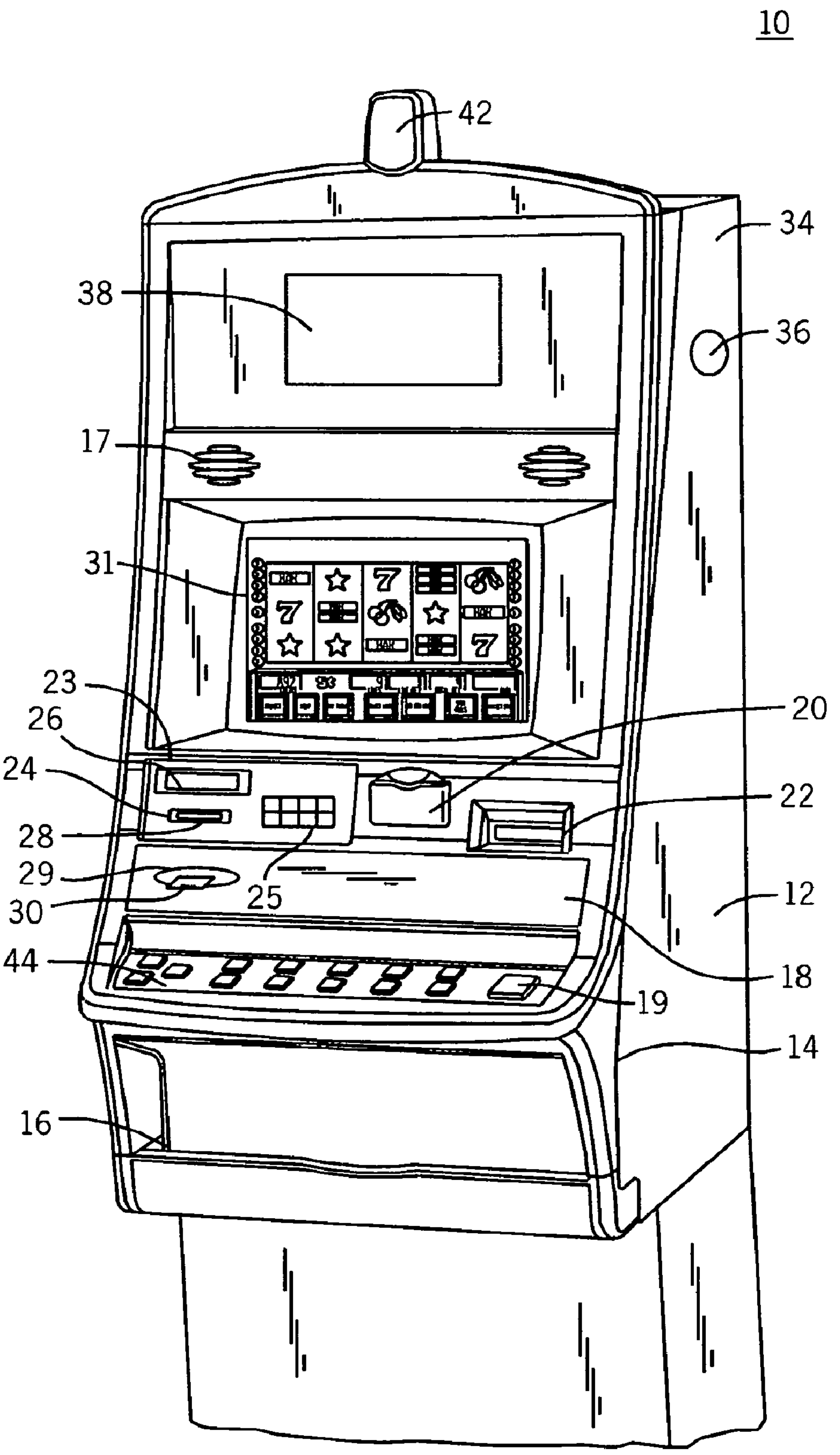
FIG. 1 is a perspective view of an embodiment of a gaming machine offering a player time-selectable bonus award scheme according to an embodiment of the invention.

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, the present invention provides a gaming machine having a player time-selectable bonus award scheme wherein a player accrues winning outcomes during base game play and then redeems the winning outcomes at a time of the player's choosing. A counter display on the gaming machine increments each time a winning outcome is accrued during base game play. The winning symbol combination and therefore the award associated with the winning outcome, however, are not revealed until the winning outcome is redeemed by the player. The counter display decrements each time the winning outcome is redeemed by the player.

The gaming machine having a player time-selectable bonus award scheme in accordance with the invention represents a "paradigm shift" in receiving a win during wagering game play. Under the old paradigm provided by prior art game play, a win (e.g., a winning reel symbol combination, a winning poker hand) is revealed immediately upon completion of a base game (e.g., a reel spin). Under the new paradigm provided by the gaming machine having a player time-selectable bonus award scheme, a winning outcome representing a yet-to-be revealed win can be held for later use, thereby allowing the player to control the rhythm and emotion of game play. In other words, a second game may be initiated (i.e., a winning outcome may be accrued) before a first game is completed. Thus, a first value payout associated with a first game outcome may be displayed on a win meter of the gaming machine after a second game is initiated but before a second value payout associated with a second game outcome (i.e., a winning symbol combination) is displayed on the win meter.

Having an effect much like the thrill and anticipation associated with unwrapping a gift, the gaming machine having a player time-selectable bonus award scheme allows the player to reveal the winning symbol combinations associated with accrued winning outcomes at a time the player feels that he/she needs them the most. For example, under the old paradigm, a player who is having an extended period of consecutive loses (dry spell) on a particular gaming machine may get discouraged and choose to play the game until a certain amount of credits are left and then cash-out; a negative game play experience. Under the new paradigm provided by the gaming machine having a player time-selectable bonus award scheme, a player with accrued winning outcomes having a dry spell may choose to use all available credits on the credit meter with the knowledge that he/she can redeem accrued winning outcomes after all available credits are used, thereby extending game play. Moreover, upon redemption of the winning outcomes, the player may feel as though he/she is playing with "house money" rather than his/her own money. Thus, the guaranteed wins resulting from redemption of the winning outcomes are used by the player to ensure a positive gaming experience.

As described below, the present invention is preferably implemented using a mechanical spinning reel slot machine. It is contemplated, however, that the present invention is also suitable for implementation in a video slot machine or in other types of video gaming machines. Winning outcomes may therefore be accrued during play of a slot game, a bingo game, a keno game, a blackjack game, or any other wagering game played on a gaming machine.

An advantageous feature of the gaming machine having a player time-selectable bonus award scheme is that redemption of a winning outcome by a player always yields a winning symbol combination and therefore an award or value payout to the player. Thus, in the context of a bonus game scheme, accrual of a winning outcome may be referred to as a "can't lose" bonus award. Redemption of a winning outcome preferably results in a winning symbol combination that is identical to a winning symbol combination displayed on a base game pay table of the gaming machine. In another embodiment of the invention, redemption of a winning outcome results in a winning symbol combination displayed on another, non-base game pay table. In both cases, the winning symbol combination is not revealed until the player chooses to redeem the winning outcome.

The math (e.g., probabilities, expected values, pays, etc) used for both base game play and redemption of the winning outcomes combine to yield a positive overall hold percentage thereby yielding a profit for the gaming proprietor. An occurrence of a particular winning symbol combination displayed in response to redemption of a winning outcome is preferably substantially identical to the occurrence of the particular winning symbol combination during play of the base game where all non-winning symbol combinations are excluded. In addition, the odds of getting a particular winning symbol combination can be decreased or increased in the player's favor during redemption of a winning outcome, and vice versa. In other words, as long as redemption of a winning outcome yields a winning symbol combination (and therefore a win), the odds of getting a particular winning symbol combination upon redemption of the winning outcome can be the same or be varied from odds of getting the particular winning symbol combination during base game play.

FIG. 1 is a perspective view of one possible embodiment of a gaming machine10 offering a player time-selectable bonus award. The gaming machine 10 may be any type of wagering gaming machine offering a player time-selectable bonus award and may therefore have varying structures and methods of operation. For example, the gaming machine 10 may be a mechanical spinning reel gaming machine (with or without and arm mechanism) configured to play a slot game, or it may be a video gaming machine configured to play a video wagering game, any number of class II or class III games defined by the Indian Gaming Regulatory Act (IRGA), and so on. Although preferably configured to operate as part of a server-based gaming network having a number of gaming machines interconnected to one or more host server(s) ("coupled server"), the gaming machine 10 may be configured to operate as a stand alone unit. For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the interior of the gaming machine 10. The cabinet 12 may also include a mechanical arm 13 which, when pulled by a player during slot game play, initiates a reel spin.

Attached to the door 14 are audio speaker(s) 17 and a belly glass area 18 that typically displays game theme artwork. The audio speaker(s) 17 may be used to generate a variety of sounds such as the sound of spinning slot machine reels, a dealer's voice, music, announcements or any other audio related to the wagering game.

Also attached to the door 14 are a number of value input devices that allow a player to insert value for game play. The value input devices may include a coin slot acceptor 20 or a note acceptor 22 to input value to the gaming machine 10. The note acceptor 22 may accept value in any number of forms, including currency or a currency-sized paper ticket voucher inscribed with information such as a bar code representing value, the name of the casino, the date, etc. As used herein, the term "value" may encompass gaming tokens, coins, paper currency, ticket vouchers, credit or debit cards, smart cards, and any other object representative of value.

The gaming machine 10 may also include a player tracking area 23 having a card reader 24, a keypad 25 and a display 26. As will be appreciated by those of ordinary skill in the art, the player tracking area 23 may be located in any number of areas of the gaming machine 10. The display 26 may be implemented using a vacuum fluorescent display (VFD), a liquid crystal display (LCD), an LED display, and/or a touch screen to display information to a game player or casino employee. The card reader 24 may include any type of card reading device, such as a magnetic card reader, smart card reader or an optical card reader. The card reader 24 may be used to read data from a card (e.g., a credit card, a player tracking card, a smart card, etc.) offered by a player. If provided for player tracking purposes, the card reader 24 may be used to read data from, and/or write data to, cards capable of storing data. Such data may include the identity of a player, the identity of a casino, the player's gaming habits, etc. Once gathered, the data can be "mined" (i.e., the data is sorted to identify patterns and establish relationships) for any number of purposes including administering player awards, distinguishing player preferences and habits, accounting, etc.

The gaming machine 10 also includes a main display device 31 for displaying video game images (e.g., simulated reel symbols, simulated cards, simulated numbers, etc.), or in the case of a mechanical spinning reel slot machine, for displaying a symbol array of artwork and blank symbols affixed to mechanical spinning reels viewable to the player. The symbol array may include occurrences of non-winning symbol combinations where no value payout is awarded to the player, or occurrences of winning symbol combinations (reflected in a pay table) where value payouts are awarded to the player. In addition, the main display device 31 may display animation, 2-D or 3-D images and digital video playback.

For video gaming machines, the main display device 31 may be implemented as a CRT, an LCD, a plasma display, or other type of video display suitable for use in a gaming machine, and may be configured with or without a touch screen. For example, in a video gaming machine offering a card game such as poker, the main display device 31 may include an LCD-TFT display displaying one or more cards.

For mechanical spinning reel slot machines, the main display device 31 may include a reel display area adapted to display game information to a player while, at the same time, allowing a player to view the reel symbol array provided by the stopped mechanical spinning reels. The game information displayed to the player may include game denominations, available credits, pay lines, wagering information, and other suitable game information. When the mechanical spinning reels are rotated and stopped, the resulting symbol array (e.g., a winning symbol array) in conjunction with game information (e.g., winning credits associated with the winning symbol combination displayed on a win meter of the gaming machine 10) displayed in the reel display area provide a game outcome and game status to the player.

Figure 2:
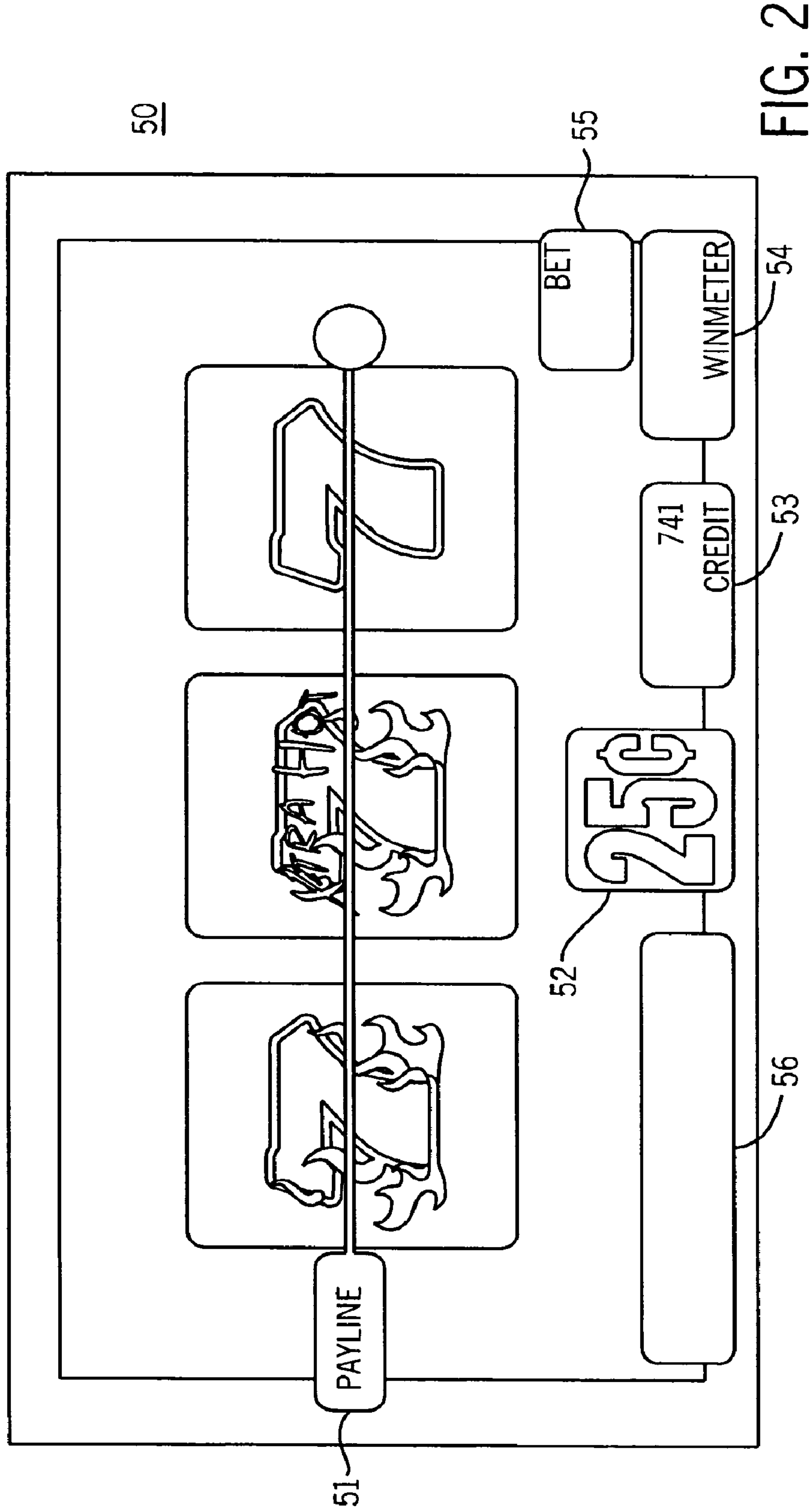
FIG. 2 is an exemplary reel display area of the gaming machine of FIG. 1.

For example, FIG. 2 is an exemplary reel display area 50 for a slot game, X-tra Hot 7's™, that may be included in the main display device 31. The exemplary reel display area 50 includes one pay line 51 superimposed across three mechanical spinning reels, a denomination indicator 52 for indicating a value-per-credit (e.g., twenty-five cents per credit), a credit meter 53 for displaying a number of credits available for game play, a win meter 54 for displaying credits resulting from a winning symbol combination, a bet indicator 55 for displaying the number of credits wagered for a particular play, and an additional information display 56. The credit meter 53, the win meter 54, the bet indicator 55, and the additional information display 56 may be enabled via an array of light emitting diodes (LEDs), a cathode ray tube (CRT), an LCD, a plasma display, or any other type of suitable display.

Referring again to FIG. 1, the gaming machine 10 may also include a box top 34 having additional speaker(s) 36 and a top box display device 38. Although not separately illustrated, the top box may include a camera and/or a microphone, and/or physical objects such as mechanical reels, wheels, or dice. The top box display device 38, if configured as a dynamic display mechanism, may enable a number of game enhancements such as bonus games, interactive tournament games, progressive jackpot games, etc.

Figure 3:
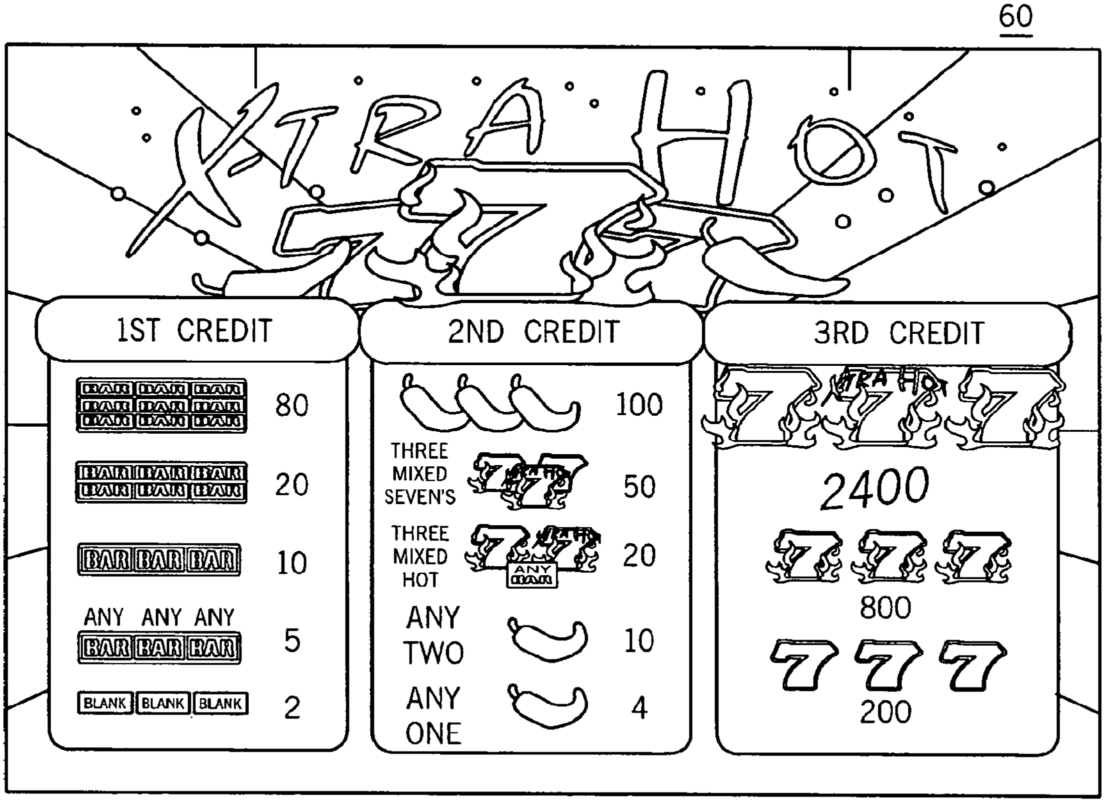
FIG. 3 is an exemplary pay table display of the gaming machine of FIG. 1.

In the case of a mechanical spinning reel slot machine, the top box display device 38 may be a static display configured to display award information such as pay tables for base or bonus games via glass art. For example, FIG. 3 is exemplary pay table 60 for the X-tra Hot 7's™ slot game. In the illustrated example, the pay table 60, including winning symbol combinations and their associated awards, is displayed via glass art. The winning symbol combinations have payout values ranging from a 2 credit payout to a 2400 credit payout. In addition, the pay table illustrates that the more credits-per-bet played, the higher the number of winning symbol combinations available to the player. For instance, if a player bets 1 credit, five winning symbol combinations are possible (resulting in 2, 5, 10, 20, or a maximum of 80 credits). If the player bets 3 credits, thirteen winning symbol combinations are possible including a 2400 credit win when an occurrence of three X-tra Hot 7 artwork symbols are displayed along the pay line.

The gaming machine 10 may also include a player control panel 44. The player control panel 44 may be provided with a number of pushbuttons or touch-sensitive areas (i.e., touch screen) that may be pressed by a player to select games, make wagers, make gaming decisions, etc. As used herein, the term "button" is intended to encompass any device that allows a player to make an input, such as a mechanical input device that must be depressed to make an input selection or a display area that a player may simply touch. The number of pushbuttons may include one or more "Bet" buttons for wagering, a "Max Bet" button for making the maximum wager allowable for the game, a "Play" button for beginning pay, a "Repeat" button for repeating the previous wagering selection, a "Collect" button for terminating play and cashing out of the game, a "Help" button for viewing a help screen, a "See Pays" button for causing the main display device 31 to generate one or more display screens showing the odds or payout information for the game or games provided by the gaming machine 10, and a "Call Attendant" button for calling an attendant. Further, although the control panel 44 is shown to be separate from the main display device 31, it should be understood that the control panel 44 could be generated by the main display device 31 as a touch-sensitive screen.

If the gaming machine 10 is configured as a spinning reel slot machine, the player control panel 44 may be provided with a number of wager selection buttons that allow a player to specify a wager amount for each pay line selected (via selecting multiple amounts of the smallest wager accepted). In addition, the gaming machine 10 may also include a number of pay line selection buttons that allow the player to select one of a number of possible of pay lines prior to spinning the reels. For example, five selection buttons may be provided to allow a player to select one, three, five, seven or nine pay lines prior to each reel spin.

Bonus Game Button

Figure 4:
FIG. 4 is a perspective view of an embodiment of a bonus button of the gaming machine of FIG. 1.

The gaming machine also includes one or more bonus game button(s) 19 adapted to enable a player who has accumulated winning outcomes to redeem the winning outcome at a time of his selection. In the illustrated example the bonus game button 19 is on the control panel 44 however, the bonus game button 19 may also be located elsewhere on the gaming machine 10, for example, on a touch screen provided by the main display device 31. In addition, the bonus game button 19 may be configured as having one of any number of shapes. For example, FIG. 4 is a perspective view of an embodiment of a bonus game button 19 having an oval shape. In the illustrated example, the bonus game button 19 includes a counter display 72 configured as two, seven-segment LEDs that displays the number of winning outcomes (up to 99) the player has accumulated during base game play. The counter display 72 increments a number when a player accrues the winning outcome and decrements the number when the player redeems the winning outcome. Although shown as a two, seven-segment LED, the counter display 72 may be implemented using other suitable methods. In addition, although shown embedded within the bonus game button 19, it is contemplated that the counter display 72 may be located elsewhere on the gaming machine 10. The bonus game button 19 also includes a feature name 74 (e.g., "Can't Lose") to direct the players attention to the counter display 72 and to enable redemption of a winning outcome(s). The bonus game button 19 may additionally include luminescent or other special lighting effects to increase visibility to the player.

Figure 14:
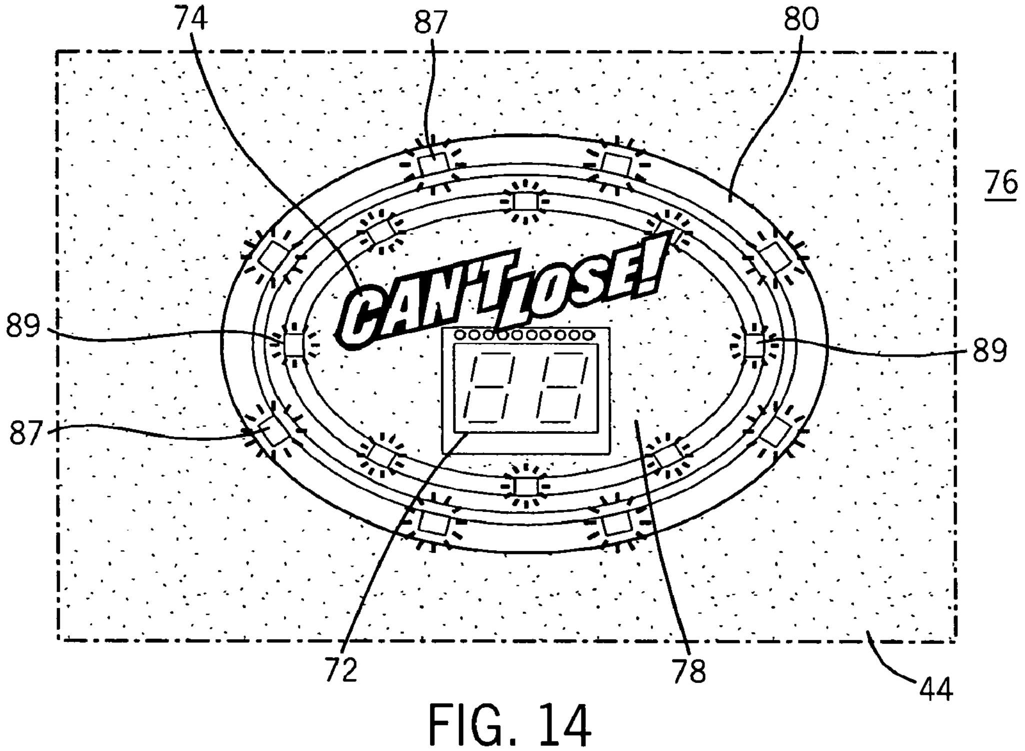
FIG. 14 is a front view of a game button of the gaming machine of FIG. 1 according to an embodiment of the invention.

For example, FIG. 14 illustrates a front view of a game button 76 according to an embodiment of the invention. The game button 76 may be used for base or bonus game play. The game button 76 includes a moveable button portion 78 surrounded by a fixed bezel portion 80. The button portion 78 is configured with the counter display 72 and the feature name 74. A button chassis 86 (discussed below) having a raised perimeter edge forms the bezel portion 80 of the game button 76. The button portion 78 moves linearly in response to player selection of the game button 76. The feature name 74 is preferably included as part of a legend plate 92 having fixed button artwork (discussed below). In the illustrated example, each of the button portion 78 and the bezel portion 80 has an independent illumination source to provide variable and independent lighting patterns ("animation") before, during and after game play.

Figure 15:
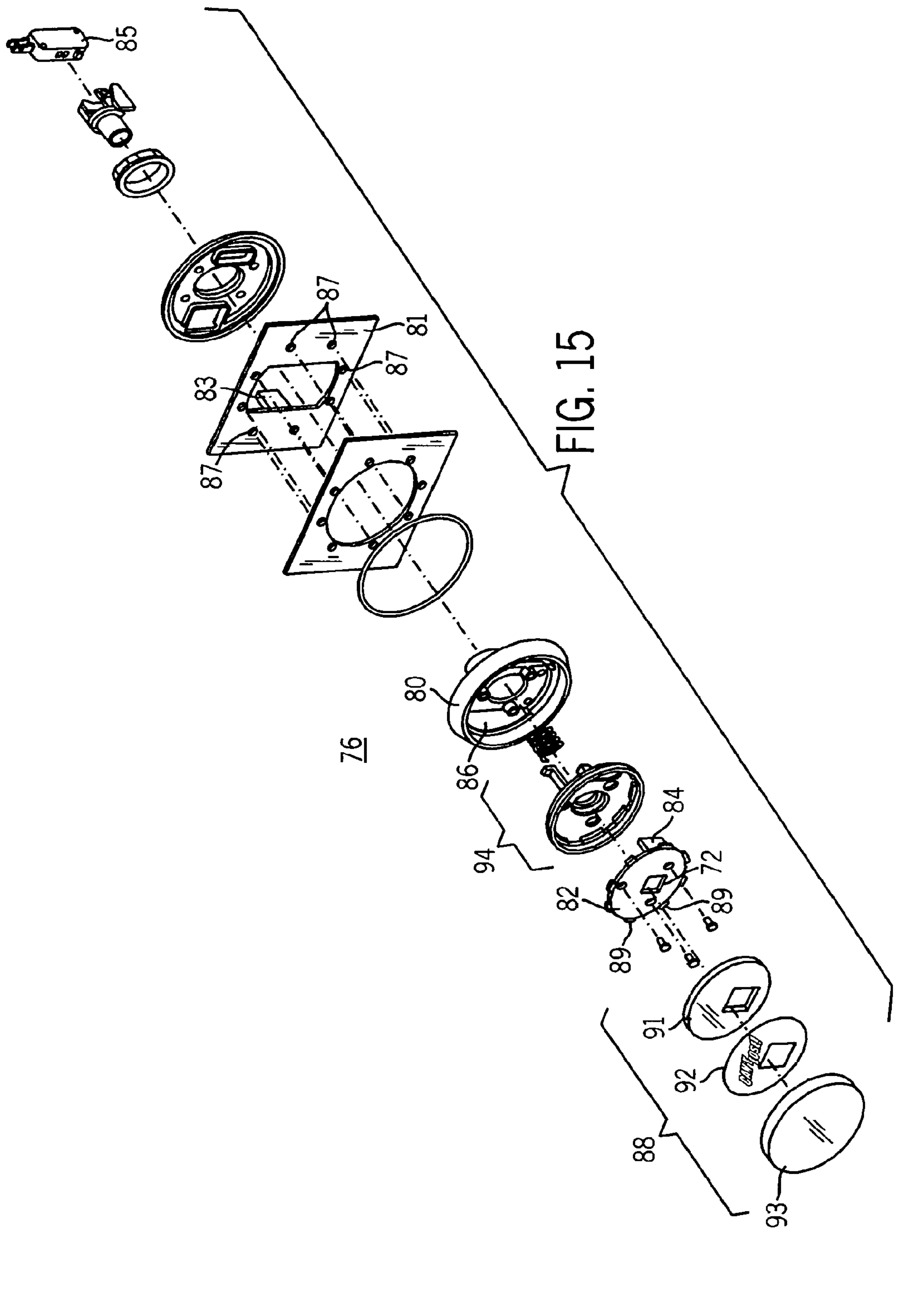
FIG. 15 is an exploded view of the game button illustrated in FIG. 14

FIG. 15 shows an exploded view of the game button 76 illustrated in FIG. 14. Referring to FIG. 15, in addition to the counter display 72, the game button 76 includes a first and second printed circuit board (PCB) 81, 82. In the illustrated example, the counter display 72 is mounted to the second PCB 82 and is configured as a two seven-segment light emitting diode display. It is contemplated however, that any other suitable display such as a small LED array or a small LCD display may be mounted to the second PCB 82 to provide numerical or non-numerical images. Further, although two printed circuit boards are included, more or less printed circuit boards may be included within the game button 76, depending on the complexity and configuration of the button.

A microcontroller 83 having a microprocessor and memory, and preferably mounted to the first PCB 81, is also included in the game button 76. An inter-board connector 84 mounted to the second PCB 82 provides electrical coupling between the first and second PCBs 81, 82. The microcontroller 83 may communicate with a gaming machine controller 200 of the gaming machine 10 (discussed below in connection with FIG. 6) using one of any number of communication link interfaces including RS-232 interface, RS-485 interface, USB interface or a proprietary protocol interface, to name a few. A button chassis 86 having the bezel 80 and coupled to both the first and second PCBs 81, 82, forms a base for the components of the button portion 78.

The game button 76 also includes a sensor 85 configured to convert linear motion, resulting from the player depressing the button portion 78, into a signal suitable for receipt by the microcontroller 83 and/or the gaming machine controller 200 and/or another coupled controller such as a coupled server controller. Although a micro-switch in conjunction with a plunger-spring assembly 94 is utilized in the game button 76 of FIG. 15, it is contemplated the sensor 85 may also be configured using any suitable sensor such as a Hall-effect sensor, an optic sensor, an eddy current sensor, a resistive sensor, a piezo sensor, a strain gage sensor, etc.

The game button 76 includes luminescent or other special lighting effects to direct the player's attention to the button. In the illustrated example, the first PCB 81 is mounted to the button chassis 86 such that vertical surface mounted LED's 87 on the first PCB 81 provide illumination, viewable by a player, to the bezel portion 80 ("bezel illumination") of the button chassis 86, before, during and after game play.

The moveable button portion 78, sized to fit within the bezel portion 80 of the button chassis 86, includes the second PCB 82, the plunger-spring assembly 94 and a button face assembly 88. The second PCB 82 preferably includes a number of right-angle surface mounted LED's 89, that when illuminated, cast side lighting upon the button face assembly 88. The vertical surface mounted LED's 87 and the right-angle surface mounted LED's 89 may illuminate in one of any number of colors including white, green, yellow, red, to name a few, or they may illuminate in multi-colors (e.g., tri-colored).

The button face assembly 88 includes an illuminator plate 91 that provides illumination enhancement to the button portion 78, and a legend plate 92 that displays button game theme artwork to the player. In addition, a suitable backing material, bonded to the illuminator plate 91 may be included to provide additional illumination enhancement to the button portion 78. A transparent lens cap 93 is also included in the button face assembly 88. The transparent lens cap 93 may be clear or it may be tinted with one of any number of colors. Thus, the lens cap 93, the legend plate 92, the illuminator plate 91, the plunger-spring assembly 94 and the second PCB 82 are sized to fit within an area bounded by the bezel portion 80 of the button chassis 86.

As will be appreciated by one skilled in the art, the components of the game button 76 can vary, depending on the complexity of the game button 76. Further, although not discussed in detailed, additional button components such as gaskets, adaptors, screws, etc., well-known in the art, may be included in the game button 76.

During game button operation, the transparent lens cap 93 provides a surface for receiving the linear motion resulting from player selection of the game button 76. When depressed by the player, the plunger-spring assembly 94 transmits the linear motion to the sensor 85. Aligned apertures included in the various game button elements (e.g., the first PCB 81, the button chassis 82, etc.) accommodate operation of the plunger-spring assembly 94 and the sensor 85. Thus, when the player pushes down on the transparent lens cap 93, apertures in the various components of the game button 76 allow the "push" to be transmitted via the plunger-spring assembly 94 and detected by the sensor 85 and the microcontroller 83.

Unlike prior art gaming machines buttons having incandescent light bulbs or LED arrays, the "intelligent" game button 76 can provide any number of varied lighting animation controlled by the microcontroller 83. As a result, cable bundling problems resulting from multiple communication links between a prior art lighted gaming machine button and an associated gaming machine controller are alleviated.

During game button operation, the microcontroller 83 may cause a variety of complex animation patterns including twinkle patterns, chase patterns, blink patterns, or combinations thereof, to name a few, to be displayed on the game button 76 via illuminating the surface mounted LEDs 87, 89. The animation patterns may be used to enhance game play and/or to inform the player of occurrences during game play. The animation patterns may also be used in conjunction with sounds or other visual displays to inform the player of occurrences during game play. Similarly, the timing of the animation patterns or any other operating aspect of the bonus game button may be controlled by the microcontroller 83.

Such variable illumination patterns may be caused by the microcontroller 83 in response to an occurrence of an event. The event may include an indication of a player selection during game play as a result of the player selecting the game button 76. For example, when the player makes a game selection during game play by depressing the button portion 78, the sensor 85 transmits a suitable signal to the microcontroller 83 indicating the player selection. In response, the microcontroller 83 may then cause a chase pattern to be illuminated on the bezel portion 80 indicating that a bonus reel spin is occurring.

The event may also include receiving a signal from the controller 200 (the gaming machine controller). For example, upon completion of a wager yielding a winning symbol combination, the player may be awarded a bonus game. A signal transmitted from the controller 200 to the microcontroller 83 may cause the game button to display a twinkling pattern, notifying the player of his good fortune. The event may also include any number of base game play events, bonus game play events, a time of day, a day of the week, a promotional activity, a local activity, an identity of the player, a selection made by a casino operator, etc.

The microcontroller 83 may also transmit a signal to the controller 200 or to another coupled controller such as a coupled server controller in response to the event. For example, upon detecting a player selection via the game button 76, the microcontroller 83 may notify the controller 200 to cause mechanical reels of the gaming machine 10 to spin while at the same time, may cause a chase pattern to be displayed on the bezel portion 80. At the conclusion of the mechanical reel spin, the microcontroller 83 (in response to a signal from the controller 200) may cause all of the LEDs mounted to first and second PCBs 81, 82 to be illuminated, thereby signaling bonus game play end to the player. Thus, in addition to detecting a player selection, the microcontroller of the game button can cause any number of illumination patterns to be displayed on the game button.

Although discussed in conjunction with a slot game, it is contemplated that the game button 76 may be used in conjunction with any type of game play on the gaming machine 10. Further, if coupled to a server in a server-based gaming network, in addition to the controller 200, the microcontroller 83 may be responsive to a coupled server controller and/or a peer gaming machine controller.

Figure 5:
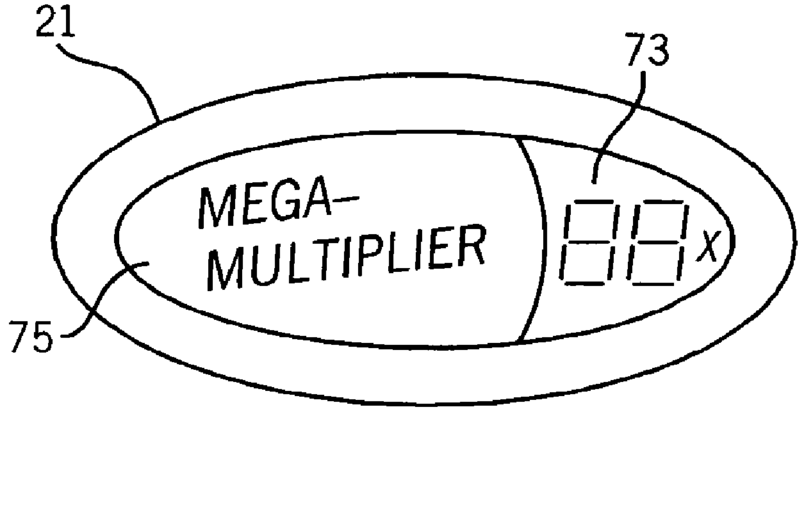
FIG. 5 is a perspective view of an embodiment of a multiplier bonus button of the gaming machine of FIG. 1.

FIG. 5 is perspective view of an embodiment of a multiplier bonus button 21 having an oval shape Like the game buttons described above, the multiplier bonus button includes a feature name 75 and a counter display 73. During operation, the counter display 73 increments by a predetermined multiplier number that can vary depending on the game implementation. Each time a winning outcome is accrued, an associated multiplier number is added to previous multiplier numbers on the counter display 73 to form a total multiplier number. When the multiplier bonus button 21 is selected by the player (indicating player desire to redeem an accrued winning outcome), an award associated with one revealed winning symbol combination is multiplied by the total multiplier number reflected on the counter display 73 to yield a multiplied, or mega-award. The mega-award is credited to the player and the counter display 73 resets to zero. Although not separately illustrated, a variable bonus game button enabling one or more of the accrued winning outcomes to be redeemed at one time my also be included on the gaming machine 10. Moreover, the bonus button, the multiplier bonus button and the variable bonus button, may be implemented as mechanical buttons or as touch screen buttons and may be included individually or in combination on any type of gaming machines.

Referring again to FIG. 1, when a player inserts value in the gaming machine 10, a number of credits corresponding to the amount deposited are shown on a credit meter for example, on the credit meter 53 (FIG. 2). After depositing the appropriate amount of value and making a pay line(s) selection, the player can begin game play by pulling the mechanical arm or by pushing an appropriate button such as the Bet button, the Max Bet button, or the Play button on the player control panel 44. Subsequent game play outcome displayed via the main display device 31 and the win meter may be determined either centrally or locally (1) using a random number generator (RNG) resulting in a pseudo random set of outcomes, or (2) by selecting a game outcome from a fixed set of outcomes (pooled), or (3) other suitable technique. When triggered by a bonus triggering event such as an occurrence of selected symbols, a winning outcome is accrued where the winning outcome (to be revealed at a time of player selection) may be determined using an RNG, a fixed set of outcomes, or other suitable technique. Additional details describing game play on the gaming machine 10 having a player time-selectable bonus award scheme are included below as described in FIG. 7.

Figure 6:
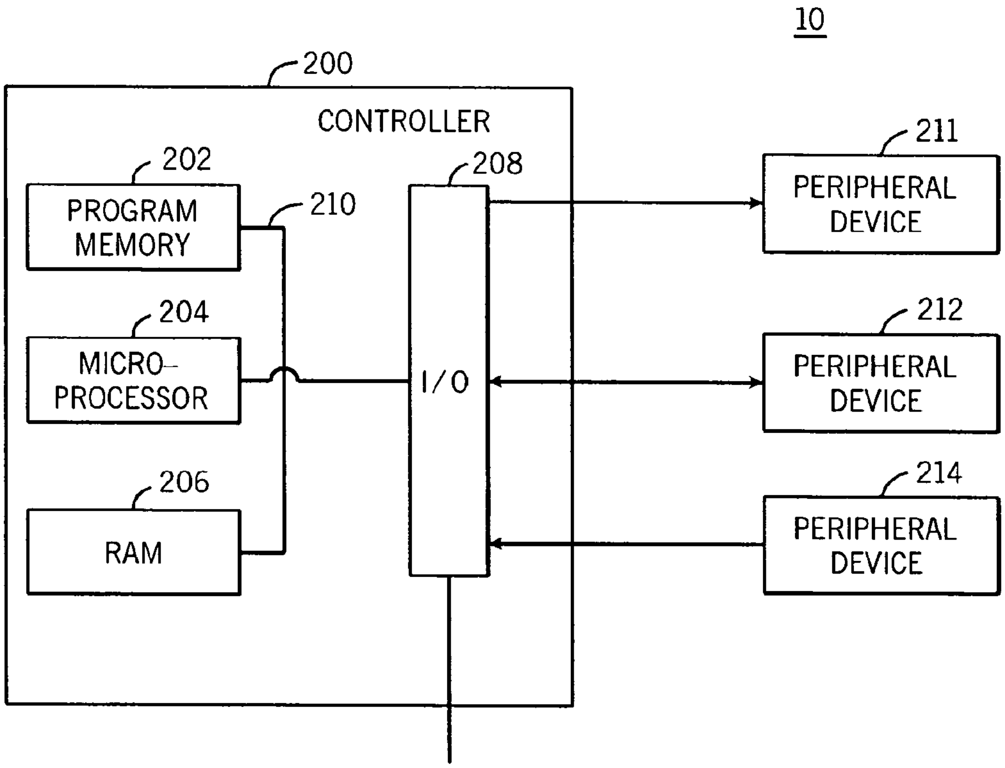
FIG. 6 is a block diagram of the electronic components of the gaming machine of FIG. 1.

FIG. 6 is a block diagram of a number of components that may be incorporated in each of the gaming machine(s) 10 of FIG. 1. Referring to FIG. 6, the gaming machine 10, includes a controller 200 that may comprise a program memory 202 (including a read only memory (ROM)), a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of displaying images, symbols and other indicia such as characters, people, places, things, and faces of cards. The RAM 206 is capable of storing event data or other data used or generated during a particular game. The program memory 202 is capable of storing program code which controls the gaming machine 10 so that it plays a particular game in accordance with applicable math models, game rules, and pay tables. For example, when a winning outcome is redeemed by a player playing a slot game, the microprocessor 204, executing code in the program memory 202, causes a winning symbol combination to be displayed to the player and causes associated credits to be awarded to the player.

It should be appreciated that although only one microprocessor 204 is shown, the controller 200 may include multiple microprocessors 204. For example, the controller 200 may include one microprocessor for executing low level gaming functions and another processor for executing higher level game functions such as some communications, security, maintenance, etc. Similarly, the memory of the controller 200 may include multiple RAMs 206 and multiple program memories 202, depending on the requirements of the gaming machine 10. Although the I/O circuit 208 is shown as a single block, it should be appreciated that the I/O circuit 208 may include a number of different types of I/O circuits. The RAM(s) 206 and program memory(s) 202 may be implemented as semiconductor memories, magnetically readable memories, and/or optically readable memories, etc. Further, the term “controller” is used herein to refer collectively to the program memory 202, the microprocessor 204, the RAM 206 and the I/O circuit 208.

FIG. 6 illustrates that multiple peripheral devices, depicted as peripheral devices 211, 212, and 214, may be operatively coupled to the I/O circuit 208. The peripheral devices may include a control panel with buttons, a coin slot acceptor, a note acceptor, a bill validator, a card reader, a keypad, a sound circuit driving speakers, a card reader display, a video display, a touch screen, etc. In the case of a spinning reel slot machine, the peripheral devices may include a number of electro-mechanical spinning reels and a mechanical arm similarly coupled to the I/O circuit 208. Although three peripheral devices are depicted, more or less peripheral devices may be included.

It should be appreciated that although the controller 200 is a preferable implementation of the present invention, the present invention also includes implementation via one or more application specific integrated circuits (ASICs), field programmable gate arrays (FPGA), adaptable computing integrated circuits, one or more hardwired devices, or one or more mechanical devices. Furthermore, although the controller 200 preferably resides in each of the gaming machine 10 the present invention includes providing some or all of its functions at another location such as a server coupled to the gaming machine 10.

One manner in which the gaming machine 10 may operate is described below in connection with one or more flowchart(s) which represents a number of portions or routines of one or more computer programs, which may be stored in one or more of the memories of the controller 200. The computer program(s) or portions thereof may also be stored remotely, outside of the gaming machine 10 and may therefore control the operation from a remote location.

As previously mentioned, typical bonus game award schemes do not allow a player to accrue bonus games for later play. Thus, the player has little control over prior bonus game play and therefore cannot control the rhythm and emotion of game play. In addition, some bonus game award schemes require a player to quickly learn new game skills to play the bonus game. The gaming machine 10 having a player time-selectable bonus award scheme however, is configured to allow a player to choose when to redeem the winning outcomes yielding winning symbol combinations and associated value payouts. In addition, redemption of the winning outcomes preferably requires only that the player select the appropriate bonus button and then use existing game skills (required for base game play) to cause the associated winning symbol combination to be displayed.

Accrual of winning outcomes by a player during base game play may be triggered by a number of events including, but not limited to, pre-selected symbols, pre-selected symbol combinations that may or may not be reflected in the base game pay table display, a player’s identity, promotional events, the number of base games played, a dollar amount or credit amount played or won by the player, player tracking card data, the time of day, the day of week, etc. Alternatively, winning outcomes may also accrue due to operation of a pseudo random generator device.

Redemption of the winning outcomes may occur in a variety of ways depending on the gaming machine configuration and the player’s preferences. In one embodiment, the gaming machine having a player time-selectable bonus award scheme is configured with a bonus button (e.g., Can’t Lose button) having a counter display or meter that increments a number each time a winning outcome is accrued and decrements the number each time a player chooses to redeem one of the accrued winning outcomes. When one winning outcome is redeemed, an award, or value payout associated with a revealed winning symbol combination is credited to the player.

Figure 7:
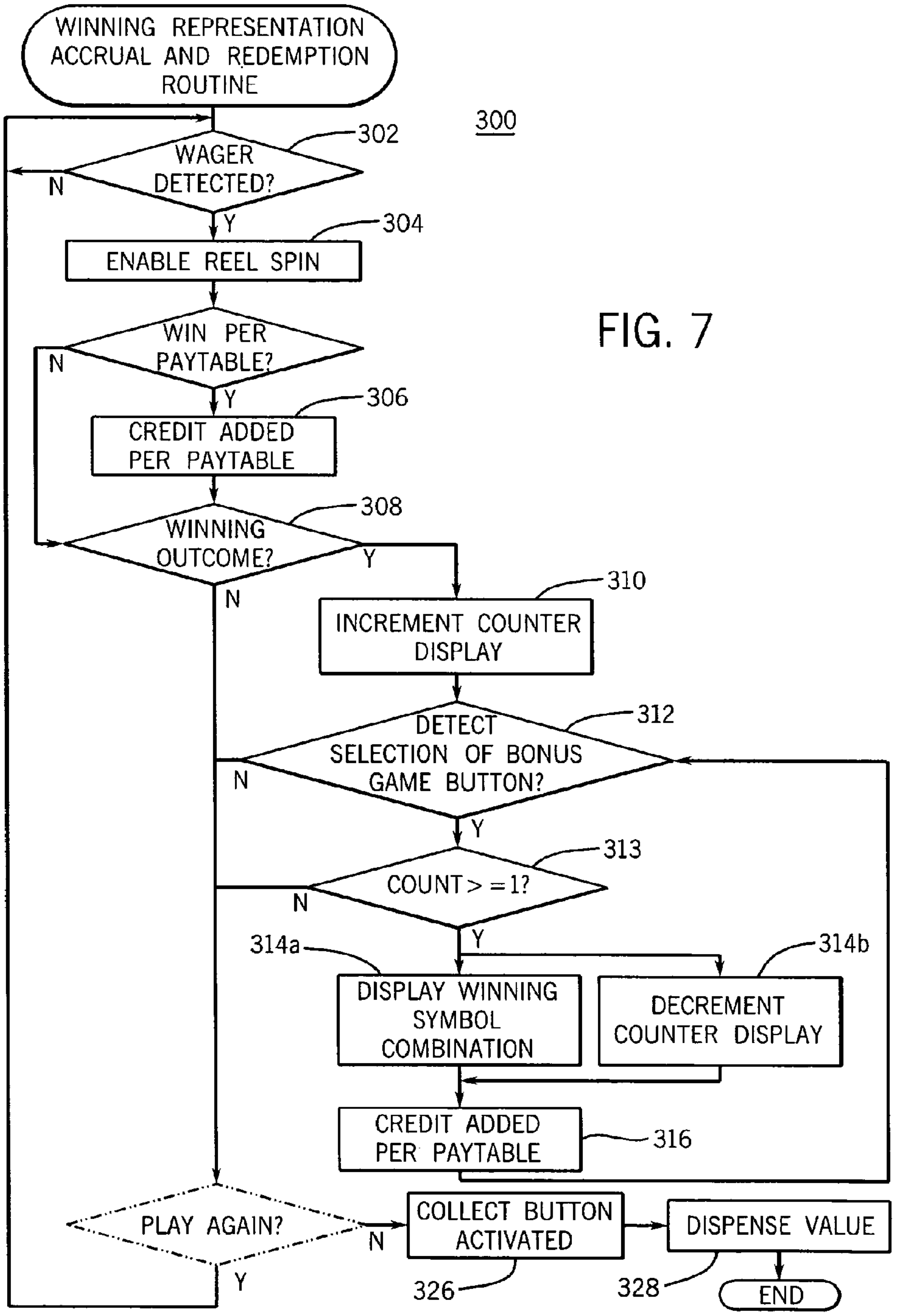
FIG. 7 is a flowchart of a winning outcome accrual and redemption routine that may be performed during operation of the gaming machine of FIG. 1.

FIG. 7 is a flowchart of a winning outcome accrual and redemption routine 300 that may be performed by the controller 200 of the gaming machine. Alternatively, the winning outcome accrual and redemption routine 300 may be performed by another controller coupled to the gaming machine 10. The winning outcome accrual and redemption routine 300 provides one example of a player time-selectable bonus award scheme provided by the gaming machine 10. Although discussed below in the context of a slot game for illustrative purposes, it is contemplated the winning outcome accrual and redemption routine 300 may be executed in conjunction with any number of other wagering games provided by gaming machines.

Referring to FIG. 7, the winning outcome accrual and redemption routine 300 begins operation when the controller 200 detects a wager for base game play (step 302). Detection of a wager includes detecting a value input, detecting a bet, and detecting game play initiation by a player. The controller 200 detects the value input when a player deposits one or more of coins, paper currency, a card, or a voucher into a value input device of the gaming machine 10. When the controller 200 detects the value input, a number of credits corresponding to the amount deposited are displayed on a credit meter of the main display device 31, for example, on the credit meter 53. After value input detection, the controller 200 enables a pay line selection. If there is only one pay line as illustrated in FIG. 2, the controller 200 enables initiation of base game play. If there is more than one pay line, the controller 200 also enables a bet-per-pay line selection. The bet-per-pay line selection causes an amount per pay line to be bet or wagered with the total wager divided equally between each selected pay line if multiple pay lines are selected. The bet-per-pay line is also displayed to the player via a bet meter (e.g., the bet meter 55) on the gaming machine 10. In addition, the controller 200 enables the player to select a maximum bet (via a “Max Bet Spin” button). Thus, the player may chose the maximum bet option causing maximum pay line selection and maximum credits rather than the pay line selection and the bet per pay line selection.

Upon detecting the pay line(s) and bet-per-pay line selections (if applicable) and verifying the value input, the controller 200 enables play of the base game; in the illustrated example, enables reel spin (step 304). The player may spin the reels of a slot game by depressing a button such as a “Spin Reels” pushbutton provided on the player control panel 44 or depressing a video display button provided by a touch screen on the gaming machine 10. Alternatively, if the slot game is a mechanical spinning reel slot game utilizing a number of mechanical spinning reels, the player may pull a handle (e.g., an electro-mechanical arm) provided on the gaming machine 10 to initiate the reel spin. In either case, the controller 200, having determined a game outcome based on operation of a pseudo random generator device, stops the reels such that they display a symbol array representing the game outcome.

Upon completion of the base game, if reel symbols on the stopped reels match one of the winning symbol combinations displayed on a pay table, the controller 200 credits (step 306) the player with a value payout associated with the displayed winning symbol combination. The additional value payout is reflected as credits on a credit meter (e.g., the credit meter 53). If reel symbols on the stopped reels do not match one of the winning symbol combinations, indicating a loss, no value payout is credited to the player.

During base game play, a player may accrue a number of winning outcomes as discussed above. Accrual of a winning outcome may result from an occurrence of a particular reel symbol or combination of reel symbols. A winning outcome may also accrue as a result of operation of a pseudo random generator device or may accrue based on a predetermined criterion such as a player's identity, promotional events, a pre-selected number of base games played, a pre-selected dollar amount or credit amount, player tracking card data, a particular time of day, day of the week, etc.

Figure 8:
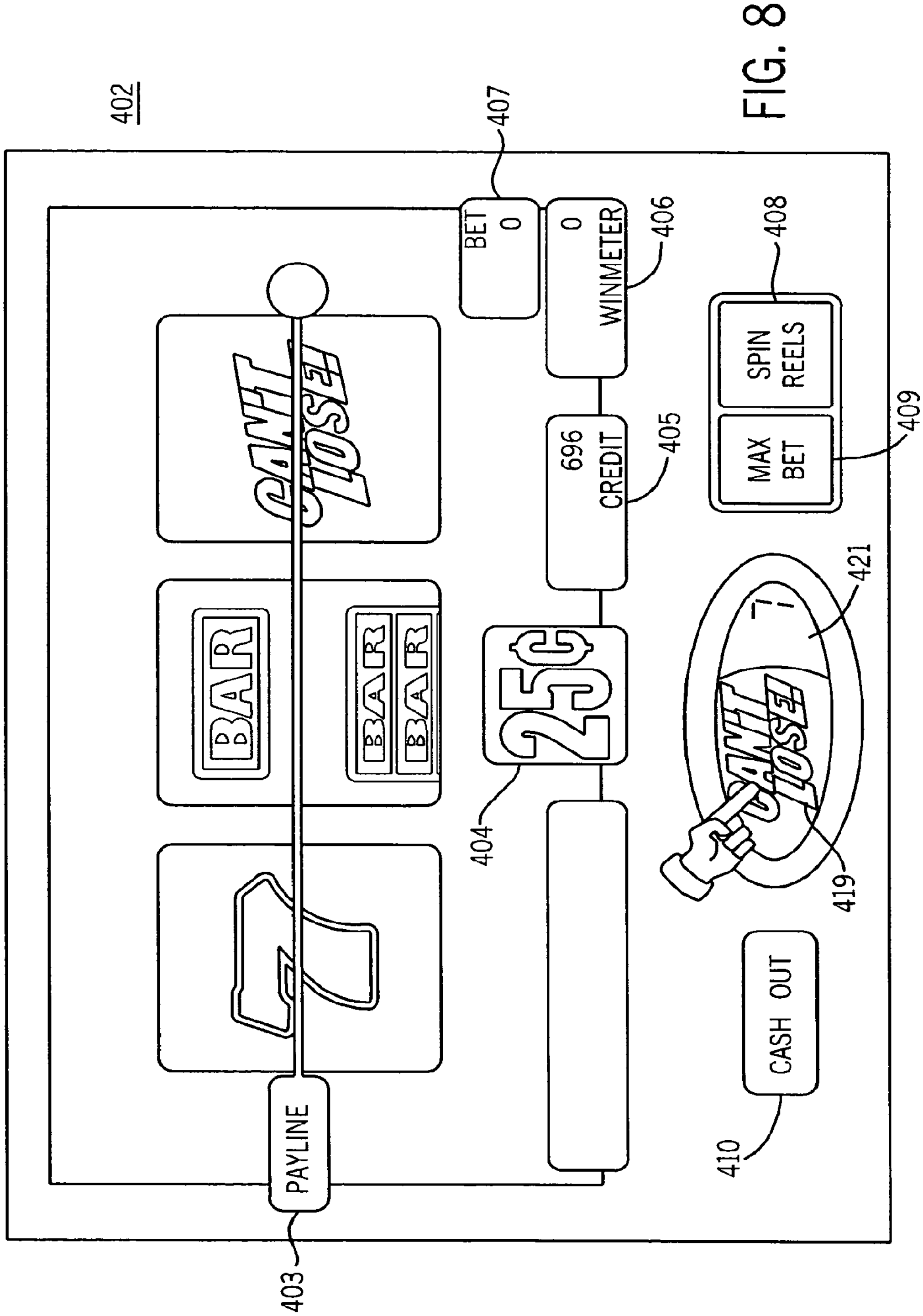
FIGS. 8-13 are a series of exemplary visual reel display areas that may be displayed during performance of the winning outcome accrual and redemption routine of FIG. 7.

As previously mentioned, a counter display on the gaming machine 10 is configured to display the number of winning outcomes the player has accrued. The details of the winning outcome, however, are not revealed until the winning outcome is redeemed by the player. For example, FIG. 8 is an exemplary reel display area 402 that may be displayed on the main display device 31 during performance of the winning outcome accrual and redemption routine 300. In the illustrated example, the exemplary reel display area 402 includes one pay line 403, a denomination indicator 404 for indicating a value-per-credit, a credit meter 405 for displaying a number of credits available for game play, a win meter 406 for displaying credits resulting from a winning symbol combination, a bet indicator 407 for displaying the number of credits wagered for a current game. Also included in the exemplary reel display area 402 are a "Spin Reels" button 408, a "Max Bet" button 409, a "Cash Out" button 410, and the bonus game button 419. As described in connection with FIGS. 4 and 5, the bonus game button 419 includes a counter display 421 and a feature name, (i.e., "Can't Lose") and is adapted to enable a player who has accumulated winning outcomes, to redeem the winning outcomes at a time of his choosing. Alternatively, the counter display 421 may be separately located from the bonus game button 419.

Referring again to FIG. 7 (in conjunction with the exemplary reel display area 402), the controller 200 determines whether the player has won, or accrued a winning outcome (step 308). If the player has not accrued a winning outcome, the controller 200 enables additional base game play if another wager is detected (step 302). If another wager is not detected and the player has not accrued a winning outcome, the controller 200 may detect selection (step 326) of a cash-out option via selection of a cash-out button by the player, for example, via selection of the "Collect" button provided on the gaming machine 10. Upon detecting selection of the cash-out button by the player, the gaming machine dispenses value (step 328) to the player and clears the credit meter accordingly. The value may be dispensed as coins, paper currency, a credit on a card, or a voucher indicating credit, depending on operation of the gaming machine 10 and the player's preferences.

Referring to FIG. 8, if the player has won a winning outcome, the controller 200 increments a number (step 310) on the counter display 421 The player then has the option of returning to base game play or redeeming the winning outcome (or a previously accrued winning outcome) via selection of the bonus game button 419. If the controller 200 detects selection of the bonus game button 419 (step 312) and the controller 200 verifies that a winning outcome has been previously accrued (step 313), and the controller 200 causes the reels to spin and then stop to display a winning symbol combination (step 314*a*) to the player. The counter display 421 is also decremented (step 314*b*) indicating that the player has redeemed one winning outcome.

As previously mentioned, a principle feature of the gaming machine 10 having the player time-selectable bonus award scheme is that redemption of a winning outcome by a player always yields a win for the player. Thus, the controller 200 credits (step 316) the player's value input based on an award or value payout associated with the displayed winning symbol combination. Further, in addition to crediting the player's value input, redemption of a winning outcome may also result in accrual of yet another winning outcome. In that case, the counter display 421 is not decremented and instead reflects the number of winning outcomes prior to redemption of the winning outcome.

If the controller 200 does not detect selection of the bonus game button 419 by the player, the controller 200 enables additional base game play. If additional game play is not desired, the controller 200 detects selection (step 326) of the cash-out option and dispenses remaining value to the player (step 328) accordingly.

For example, referring again to FIG. 8, upon completion of a reel spin, the credit meter 405 displays 696 available credits for additional game play, the win meter 406 displays no credits indicating that the player did not get a winning symbol combination, and the counter display 421 on the bonus game button displays seven accrued winning outcomes.

Figure 9:
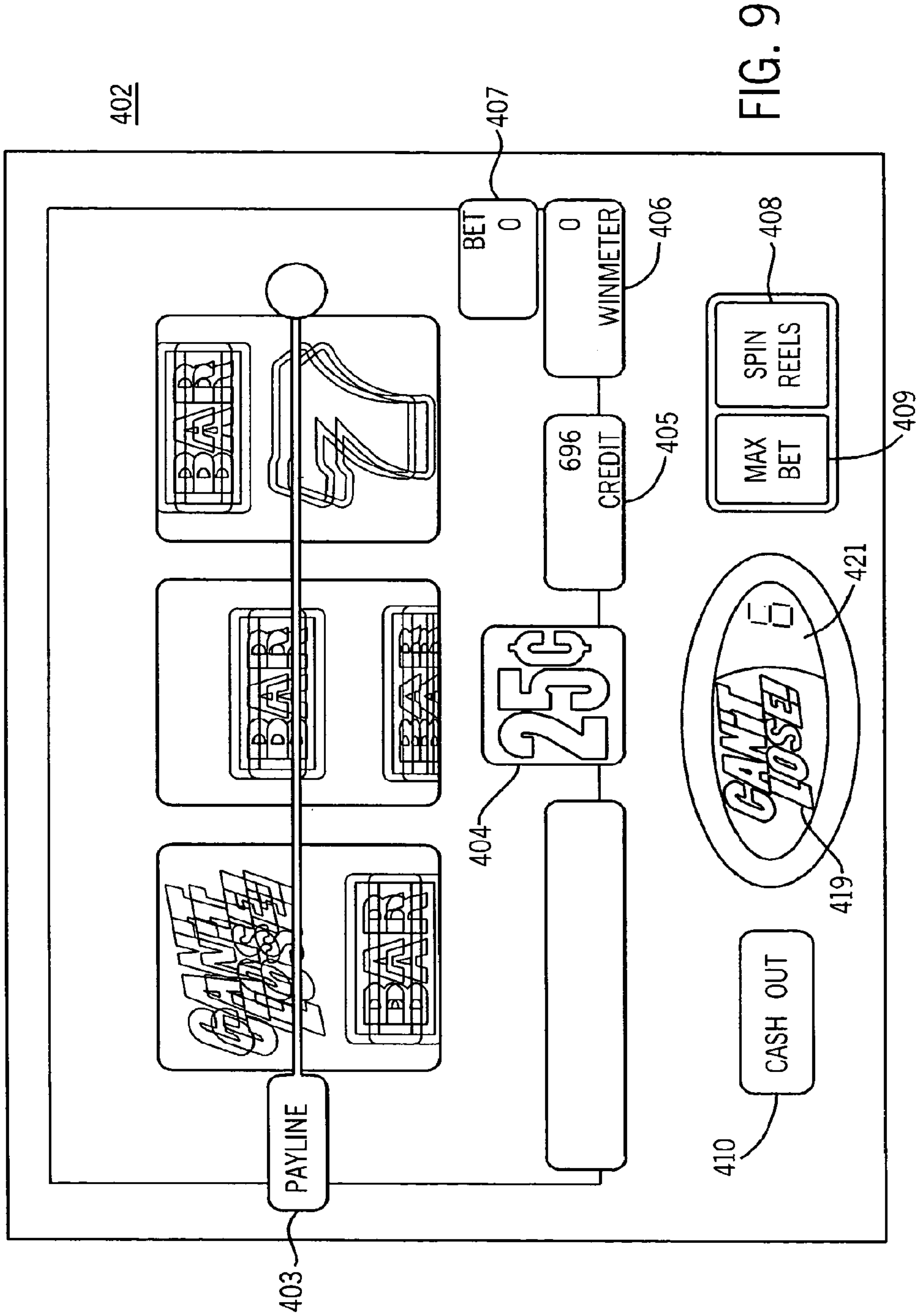
Figure 10:
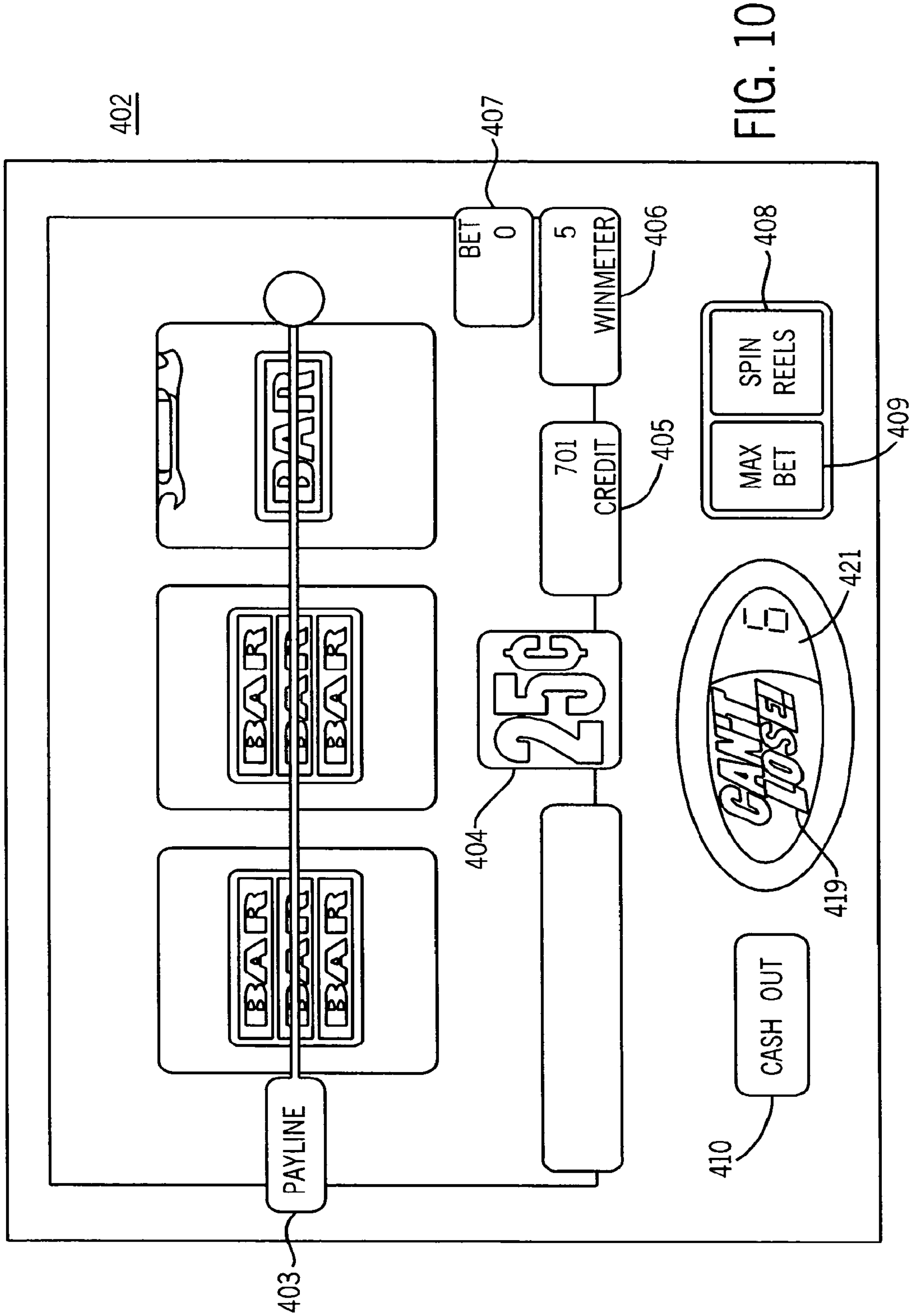

As mentioned above, the player may choose to redeem accumulated winning outcomes at any time during base game play. If the player chooses to redeem a winning outcome, the player selects the bonus game button 419. Upon selection of the bonus game button 419 (step 312), the controller 200 causes the reels to spin (FIG. 9) and then stop (FIG. 10) to display a winning symbol combination (e.g., 2 triple bars and 1 single bar) to the player (step 314*a*). In addition, the controller 200 cause the counter display 421 to decrement by one (step 314*b*), yielding six remaining winning outcomes.

Figure 11:
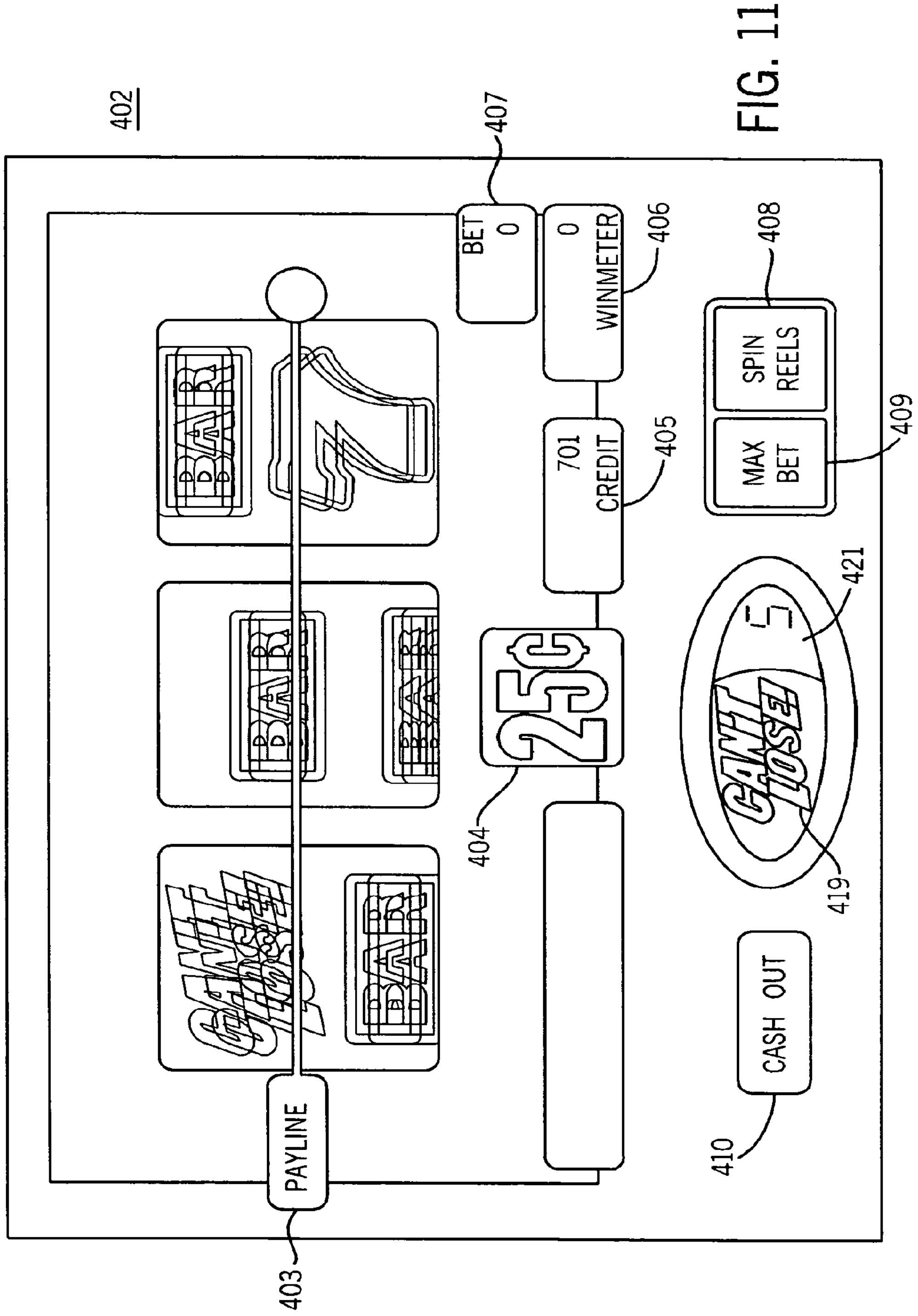
Figure 12:
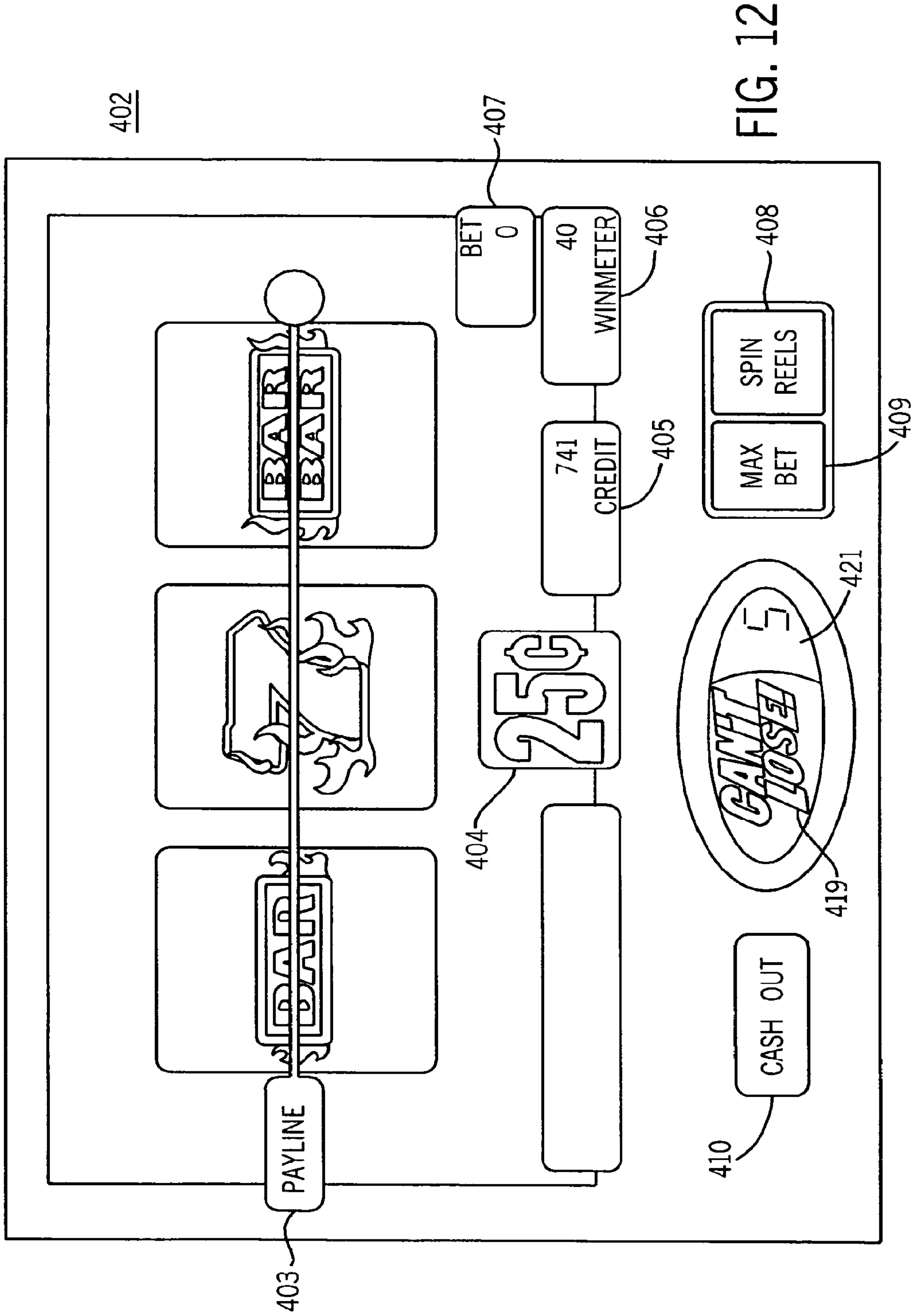

As a result of the winning symbol combination, the number of available credits is increases by five from 696 to 701 credits. Continuing with the example, if the player redeems another winning outcome, the controller 200 causes the reels to spin (FIG. 11) and then stop (FIG. 12) to display another winning symbol combination (e.g., 1 single bar with fire, 7 with fire and a double bar with fire) to the player (step 314*a*). In addition, the controller 200 causes the counter display 421 to decrement by one (step 314*b*), yielding five remaining winning outcomes.

Figure 13:
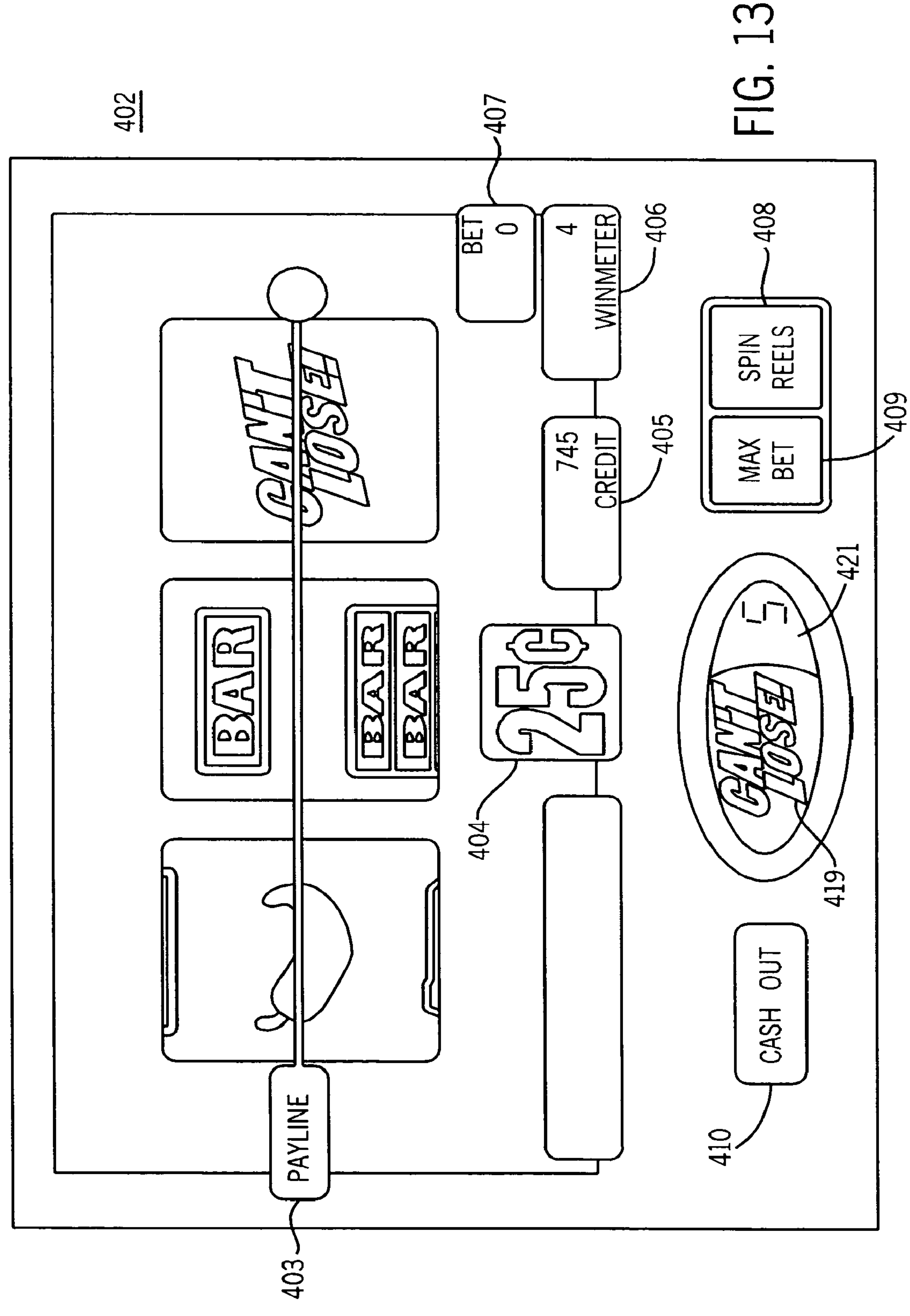

As a result of the winning symbol combination, the number of available credits is increased by 40 from 701 to 741 credits. If the player redeems yet another winning outcome, the controller 200 causes the reels to spin and then stop (FIG. 13) to display yet another winning symbol combination plus a winning outcome (e.g., 1 chili pepper with a guaranteed win, and an additional winning outcome shown as Can't Lose) to the player (step 314*a*). The controller 200 does not cause the counter display 421 to decrement by one because the spin resulted in the addition of another winning outcome. Thus after the spin, five winning outcomes still remain.

As a result of the winning symbol combination (e.g., the chili pepper with a guaranteed win), the number of available credits is increases by four from 741 to 745 credits. If the player chooses to return to base game play, the controller 200 detects a wager (step 302) and play continues as described above. Alternatively, if the player chooses to cash-out, the controller 200 detects activation of the collect button (step 326) and dispenses value (step 328) in an amount equivalent to seven hundred and forty-five credits.

In another embodiment of the invention, the gaming machine 10 having a player time-selectable bonus award scheme is configured with multiplier bonus button (e.g., Mega-multiplier button) having a counter display or meter that increments a multiplier number each time a winning outcome is accrued and decrements to zero each time the player selects the multiplier bonus button to redeem all accrued winning outcome(s) at one time. The counter display increments by a predetermined multiplier number that can vary depending on the game implementation. Each time a winning outcome is accrued, an associated multiplier number is added to previous multiplier numbers on the counter display to form a total multiplier number. When redeemed, an award associated with one revealed winning symbol combination is multiplied by the total multiplier number reflected on the counter display, and the resulting multiplied award, or "mega-award", is credited to the player. Thus, all winning outcomes previously accrued are redeemed at one time, resulting in one winning symbol combination yielding a mega-award, and the counter display resets to zero.

For example, a mechanical spinning reel slot machine having a player time-selectable bonus award scheme may be configured with three reels with each reel displaying one Mega-multiplier Can't Lose symbol among other reel symbols. Each of the Mega-multiplier Can't Lose symbols has a different predetermined multiplier number although it is contemplated that the Mega-multiplier Can't Lose symbols on each of the reels can have the same multiplier number. The first Mega-multiplier Can't Lose symbol has a multiplier number of 3×, the second has a multiplier number of 4×, and the third has a multiplier number of 10×. During game play, one spin results in accrual of a 3× winning outcome and another spin results in accrual of a 10× winning outcome. A counter display of the mechanical spinning reel slot machine therefore reflects a 13× winning outcome. At a time of the player's choosing, the player selects a Mega-multiplier Can't Lose button on the mechanical spinning reel slot machine and the mechanical spinning reels spin until a winning symbol combination is displayed. A mega-award equivalent to 13 times the award associated with the winning symbol combination is credited to the player and the counter display is decremented to zero.

In yet another embodiment of the invention, the gaming machine having a player time-selectable bonus award scheme is configured with (1) a counter display that increments a number each time a winning outcome is accrued and decrements the number each time a player chooses to redeem the accrued winning outcome, (2) a bonus button (e.g., a Can't Lose button) that enables the player to redeem one winning outcome at a time, and (3) a multiplier bonus button (e.g., a Mega-multiplier button) that enables the player to redeem all winning outcomes at one time via displaying one winning symbol combination with an award that is multiplied by a number equivalent to all of the accrued winning outcomes. If the player selects the first button to redeem one winning outcome, the counter display is decremented by one number. If the player selects the second button to redeem all winning outcomes at one time, the counter display is reset to zero (unless redemption results in another winning outcome). In addition, an award associated with one revealed winning symbol combination is multiplied by the total multiplier number reflected on the counter display, and the resulting multiplied award, or "mega-award", is credited to the player In a further embodiment of the invention, the gaming machine having a player time-selectable bonus award scheme is configured with (1) a counter display that increments by a number each time a winning outcome is accrued and decrements by a number equivalent to a number of winning outcomes the player chooses to redeem at one time, (2) a variable bonus button (e.g., Variable Can't Lose button) that enables the player to redeem one or more winning outcomes at one time via displaying one winning symbol combination with an associated award that is multiplied by a number equivalent to the number of winning outcomes that the player redeems at the one time. Thus, when the player selects the variable bonus button to redeem two winning outcomes at one time, the counter display decrements by two, and the award associated with the resulting winning symbol combination is multiplied by two.

For example, a mechanical spinning reel slot machine having a player time-selectable bonus award scheme may be configured with a counter display and a Variable Can't Lose™ button. During game play, one spin may result in accrual of one winning outcome; the counter display increments one. Another spin may result in a 3× winning outcome; the counter display incrementing three to yield a total of four accrued winning outcomes. Yet another spin may result in accrual of a 10× winning outcome. The counter display of the mechanical spinning reel slot machine therefore reflects a total of a 14 winning outcomes. At a time of the players choosing, the player selects the Variable Can't Lose button to redeem one winning outcome. An award associated with the resulting winning symbol combination is credited to the player and the counter display reflects a total of 13 winning outcomes. Next, the player elects to redeem four winning outcomes at one time via selecting the Variable Can't Lose button. An award equivalent to four times the award associated with the resulting winning symbol combination is credited to the player and the counter display decrements to reflect a total of nine winning outcomes.

In some cases, a player may have depleted the credits displayed on the credit meter 405 but have remaining accrued winning outcomes displayed on the a counter display. As previously mentioned, the intelligent game button 76 providing lighted animation patterns may also be used in conjunction with sounds or other visual displays to inform the player of occurrences such as depleted credits. For example, a "reminder sound" in conjunction with a particular animation pattern displayed by the game button 76 can be used to notify the player of a need to redeem the remaining accrued winning outcomes when credits are depleted. Although discussed below in terms of a mechanical sound, the reminder sound may be one of any number of suitable audible indications heard by a player of the gaming machine 10.

In one embodiment, the reminder sound may be a mechanical sound generated by operation of a mechanical device such as solenoid within the gaming machine 10. For example, a solenoid in a mechanical arm of a gaming machine is typically utilized to lock the mechanical arm into a fixed position. Upon receipt of a wager for game play, a signal from the gaming machine controller 200 to solenoid windings causes actuation of the solenoid, thereby enabling a player to pull the arm and initiate a mechanical reel spin. A distinctive "click" sound is emitted and a distinctive vibration of the gaming machine occurs when the solenoid is actuated.

In a case where the player may have depleted game credits, one or more clicks of the solenoid in conjunction with a particular illumination pattern (animation) displayed on the game button 76 may inform the player of a need to redeem accrued winning outcomes. For example, after a suitable pause (e.g., four seconds) commencing at the completion of the most recent reel spin, three clicks of the solenoid in conjunction with three full illuminations of the game button 76 can be used to inform the player of the need to redeem accrued winning outcomes. An animation pattern displayed around a bezel portion of the game button 76 may also be displayed after completion of the three full illuminations and until the player depresses the game button 76. In this way, the player is audio-visually notified of the need to redeem accrued winnings outcomes.

As may be apparent from the above discussion, a second game may be initiated (i.e., a winning outcome may be accrued) before a first game is completed. In other words, a first value payout associated with a first game outcome may be displayed on a win meter of the gaming machine after a second game is initiated but before a second value payout associated with a second game outcome (i.e., a winning symbol combination) is displayed on the win meter.

Further, the present invention providing a player time-selectable bonus award scheme enhances game play by providing the player with an opportunity to accumulate, and redeem, at a time of the player's choosing, winning outcomes yielding winning symbol combinations having guaranteed awards. Redemption of each of the accrued winning outcomes is accomplished when a player selects an option to display a winning symbol combination associated with the winning outcome. Selection of the option to display the winning symbol combination associated with the winning outcome always yields an award and sometimes yields another winning outcome symbol, redeemable at a time of the player's choosing. A counter display on the gaming machine increments a number as each winning outcome is accrued, and decrements the number as each winning outcome is redeemed.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

It is claimed:

1. A gaming machine comprising:
- an input device for accepting inputs from a player to play a wagering game;
- a display for displaying the wagering game; and
- a game button for receiving selections related to the wagering game, the game button having an enclosure for mounting components of the game button
  - at least one variable display located within the enclosure and capable of presenting a plurality of images thereon; and
  - a memory located within the enclosure and communicatively coupled with the at least one variable display, the memory adapted to store information for producing the plurality of images presented on the display, the memory being associated solely with the game button and not another game button.

2. The gaming machine of claim 1, wherein the stored information is utilized by the at least one variable display of the game button, the stored information being accessed in the memory solely by the game button.

3. The gaming machine of claim 1, wherein the at least one variable display is a liquid crystal display.

4. The gaming machine of claim 1, wherein the memory is included in a microcontroller also including a microprocessor, the microcontroller being communicatively coupled to the at least one variable display, the microcontroller being associated solely with the game button, the microcontroller controlling the presentation of the plurality of images on the at least one variable display.

5. The gaming machine of claim 4, wherein the microcontroller controls the presentation of the plurality of images on the at least one variable display associated with the game button and does not control the presentation of images on any display not associated with the game button.

6. The gaming machine of claim 4, wherein the microcontroller is communicatively coupled to at least one controller selected from a group consisting of a gaming machine controller, a server controller, and a peer gaming machine controller.

7. The gaming machine of claim 6, wherein the microcontroller communicates with the controller via a universal serial bus interface.

8. The gaming machine of claim 4, wherein the microcontroller is communicatively coupled to a server controller, the microcontroller presenting at least one image on the at least one variable display in response to receiving a transmitted signal from the server controller.

9. The gaming machine of claim 1, wherein the plurality of images form a complex animation pattern.

10. A gaming machine comprising:
- a value input device for receiving a wager input from a player for conducting a wagering game;
- a display for displaying a randomly selected outcome of the wagering game in response to receiving the wager input, the randomly selected outcome being selected from a plurality of outcomes;
- a control panel having one or more game buttons, at least one of the game buttons including
  - an enclosure for mounting components of the game button,
  - at least one variable display located within the enclosure and capable of presenting a plurality of images thereon,
  - a sensor located within the enclosure, and
  - a memory located within the enclosure and communicatively coupled with the at least one variable display.

11. The gaming machine of claim 10, wherein the stored information is utilized solely by the at least one variable display of the game button.

12. The gaming machine of claim 10, wherein the memory is included in a microcontroller also including a microprocessor, the microcontroller being communicatively coupled to the at least one variable display, the microcontroller being associated solely with the game button, the microcontroller controlling the presentation of the plurality of images on the at least one variable display.

13. The gaming machine of claim 12, wherein the microcontroller controls the presentation of the plurality of images on the at least one variable display associated with the game button and does not control the presentation of images on any display not associated with the game button.

14. The gaming machine of claim 12, wherein the microcontroller is communicatively coupled to at least one controller selected from a group consisting of a gaming machine controller, a server controller, and a peer gaming machine controller.

15. The gaming machine of claim 14, wherein the microcontroller communicates with the controller via a universal serial bus interface.

16. The gaming machine of claim 12, wherein the microcontroller is communicatively coupled to a server controller, the microcontroller presenting at least one image on the at least one variable display in response to receiving a transmitted signal from the server controller.

17. The gaming machine of claim 10, wherein the plurality of images form a complex animation pattern.

18. A method for conducting a wagering game comprising:

accepting a wager input from a player via a wager input device;

in response to the wager input, displaying on a display of a gaming machine a randomly selected outcome of a plurality of outcomes;

receiving via a game button a player selection related to the wagering game;

presenting a plurality of images on at least one variable display of the game button, the variable display being located within an enclosure of the game button; and retrieving the plurality of images from a memory communicatively coupled solely with the game button and not another game button, the memory being located within the enclosure and adapted to store information for producing the plurality of images presented on the at least one variable display of the game button.

19. The method of claim 18, further comprising controlling the presentation of the plurality of images on the at least one variable display via a microcontroller that is associated solely with the game button, the microcontroller including the memory and being a dedicated microcontroller for the game button.

20. The method of claim 19, wherein the microcontroller is communicatively coupled to at least one controller selected from a group consisting of a gaming machine controller, a server controller, and a peer gaming machine controller.

21. The method of claim 20, wherein the microcontroller communicates with the controller via a universal bus interface.

22. The method of claim 18, further comprising presenting at least one image of the plurality of images in response to receiving a transmitted signal from a server controller, the microcontroller being communicatively coupled to the server controller.

23. The method of claim 18, further comprising forming a complex animation pattern on the at least one variable display of the game button.

* * * * *